US011958064B2

(12) United States Patent
Tomac et al.

(10) Patent No.: US 11,958,064 B2
(45) Date of Patent: Apr. 16, 2024

(54) VARIABLE CHARACTERISTICS FLUIDIC OSCILLATOR AND FLUIDIC OSCILLATOR WITH THREE DIMENSIONAL OUTPUT JET AND ASSOCIATED METHODS

(71) Applicant: Ohio State Innovation Foundation, Columbus, OH (US)

(72) Inventors: Mehmet Tomac, Worthington, OH (US); James Gregory, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 477 days.

(21) Appl. No.: 16/767,847

(22) PCT Filed: Nov. 28, 2018

(86) PCT No.: PCT/US2018/062812
§ 371 (c)(1),
(2) Date: May 28, 2020

(87) PCT Pub. No.: WO2019/108628
PCT Pub. Date: Jun. 6, 2019

(65) Prior Publication Data

US 2020/0306771 A1 Oct. 1, 2020

Related U.S. Application Data

(60) Provisional application No. 62/591,476, filed on Nov. 28, 2017.

(51) Int. Cl.
*B05B 1/08* (2006.01)
*F15C 1/22* (2006.01)

(52) U.S. Cl.
CPC . *B05B 1/08* (2013.01); *F15C 1/22* (2013.01)

(58) Field of Classification Search
CPC ................ B05B 1/08; B05B 1/10; F15C 1/22
See application file for complete search history.

(56) References Cited

U.S. PATENT DOCUMENTS

| | | |
|---|---|---|
| 2,916,873 A | 12/1959 | Walker |
| 2,943,821 A | 7/1960 | Wetherbee |

(Continued)

FOREIGN PATENT DOCUMENTS

| | | |
|---|---|---|
| CA | 2711711 A1 | 2/2012 |
| DE | 102017206849 A1 | 10/2018 |

(Continued)

OTHER PUBLICATIONS

Partial International Search and Written Opinion Relating to Partial International Search Result, issued by the International Searching Authority (ISA/EP) in PCT Application No. PCT/US2020/017249 dated Dec. 10, 2020. 15 pages.

(Continued)

*Primary Examiner* — Qingzhang Zhou
(74) *Attorney, Agent, or Firm* — Meunier Carlin & Curfman LLC

(57) ABSTRACT

Various implementations include a fluidic oscillator having at least one control port. The at least one control port is for introducing a control fluid into the fluidic oscillator or suctioning the fluid stream from the fluidic oscillator. The introduction of a control fluid into the fluidic oscillator or suction of the fluid stream from the fluidic oscillator alters the frequency and sweeping angle of the oscillating fluid stream as it exits the fluidic oscillator. Various other implementations include a fluidic oscillator having a first control port defined by the first portion of the outlet nozzle and a second control port defined by the second portion of the outlet nozzle. The introduction of a control fluid into the fluidic oscillator or suction of the fluid stream from the fluidic oscillator through the control ports alters the exit (Continued)

angle of the oscillating fluid stream as it exits the fluidic oscillator.

11 Claims, 26 Drawing Sheets

(56) References Cited

U.S. PATENT DOCUMENTS

| | | | | |
|---|---|---|---|---|
| 3,117,593 | A | 1/1964 | Sowers, III | |
| 3,204,405 | A | 9/1965 | Warren et al. | |
| 3,212,259 | A | 10/1965 | Edward | |
| 3,228,410 | A | 1/1966 | Warren | |
| 3,266,510 | A | 8/1966 | Wadey | |
| 3,427,809 | A | 2/1969 | Lavoie | |
| 3,448,752 | A | 6/1969 | O'Neill | |
| 3,552,415 | A | 1/1971 | Small | |
| 3,605,778 | A | 9/1971 | Metzger | |
| 3,614,964 | A | 10/1971 | Chen | |
| 3,749,317 | A | 7/1973 | Osofsky | |
| 4,122,845 | A * | 10/1978 | Stouffer | B05B 11/00 401/15 |
| 4,463,904 | A | 8/1984 | Bray, Jr. | |
| 4,508,267 | A | 4/1985 | Stouffer | |
| 4,596,364 | A | 6/1986 | Bauer | |
| 4,955,547 | A | 9/1990 | Woods | |
| 5,524,660 | A | 6/1996 | Dugan | |
| 5,827,976 | A | 10/1998 | Stouffer et al. | |
| 5,845,845 | A | 12/1998 | Merke et al. | |
| 5,876,182 | A | 3/1999 | Schulte | |
| 6,253,782 | B1 | 7/2001 | Raghu | |
| 6,497,375 | B1 | 12/2002 | Srinath et al. | |
| 7,036,749 | B1 | 5/2006 | Steerman | |
| 7,128,082 | B1 | 10/2006 | Cerretelli et al. | |
| 7,775,456 | B2 | 8/2010 | Gopalan et al. | |
| 8,297,540 | B1 | 10/2012 | Vijay | |
| 8,382,043 | B1 | 2/2013 | Raghu | |
| 8,869,320 | B1 | 10/2014 | Santamarina et al. | |
| 9,333,517 | B2 | 5/2016 | Koklu | |
| 9,339,825 | B2 | 5/2016 | Koklu | |
| 9,802,209 | B2 | 10/2017 | Koklu | |
| 10,429,138 | B2 | 10/2019 | Gissen et al. | |
| 2005/0087633 | A1 | 4/2005 | Gopalan | |
| 2006/0157596 | A1 * | 7/2006 | Tippetts | G01P 5/00 239/589.1 |
| 2007/0063076 | A1 | 3/2007 | Gopalan | |
| 2008/0149205 | A1 | 6/2008 | Gupta et al. | |
| 2010/0123031 | A1 | 5/2010 | Weber | |
| 2012/0175438 | A1 | 7/2012 | Ji et al. | |
| 2013/0048274 | A1 | 2/2013 | Schultz et al. | |
| 2014/0103134 | A1 | 4/2014 | Raghu | |
| 2016/0030954 | A1 * | 2/2016 | Gopalan | B60S 1/52 239/466 |
| 2016/0052621 | A1 | 2/2016 | Ireland et al. | |
| 2016/0243562 | A1 | 8/2016 | Koklu | |
| 2016/0318602 | A1 | 11/2016 | Whalen et al. | |
| 2017/0216852 | A1 | 8/2017 | Gopalan et al. | |
| 2017/0326560 | A1 | 11/2017 | Kanda | |
| 2018/0281930 | A1 | 10/2018 | Koklu et al. | |
| 2018/0370617 | A1 | 12/2018 | Raghu | |
| 2019/0145441 | A1 | 5/2019 | Tomac et al. | |
| 2020/0038884 | A1 | 2/2020 | Wintering et al. | |
| 2020/0376503 | A1 | 12/2020 | Wintering et al. | |

FOREIGN PATENT DOCUMENTS

| | | | |
|---|---|---|---|
| EP | 2554854 | A2 | 2/2013 |
| EP | 2708426 | B1 | 3/2014 |
| JP | 2005-247187 | A | 9/2005 |
| JP | 2013-001246 | A | 1/2013 |
| WO | 80/00927 | A1 | 5/1980 |
| WO | 2007/149436 | A1 | 12/2007 |
| WO | 2008/135967 | A1 | 11/2008 |
| WO | 2016/025858 | A1 | 2/2016 |
| WO | 2016/161349 | A1 | 10/2016 |
| WO | 2017/194525 | A1 | 11/2017 |
| WO | 2018197231 | A1 | 11/2018 |
| WO | 2020/243274 | A2 | 12/2020 |
| WO | 2021/096515 | A1 | 5/2021 |
| WO | 2021/096516 | A1 | 5/2021 |
| WO | 2021/145905 | A1 | 7/2021 |

OTHER PUBLICATIONS

Gokoglu, S. A., Kuczmarski, M. A., Culley, D. E., and Raghu, S., 2011, "Numerical studies of an array of fluidic diverter actuators for flow control," AIAA-2011-3100, Proceedings of the 41st AIAA Fluid Dynamics Conference and Exhibit, Honolulu, HI. 14 pages.

Shigeta, M., Miura, T., Izawa, S., and Fukunishi, Y., 2009, "Active Control of Cavity Noise by Fluidic Oscillators," Theoretical and Applied Mechanics Japan, vol. 57, pp. 127-134.

International Search and Written Opinion issued by the International Searching Authority (ISA/EP) in PCT Application No. PCT/US2020/017249 dated Feb. 12, 2021. 23 pages.

European Patent Office. Extended European Search Report, issued in European Application No. 18883610.0 dated Jul. 16, 2021, 8 pages.

Invitation to Pay Additional Fees and Communication Relating to the Results of the Partial International Search, issued by the International Searching Authority (ISA/EP) in PCT Application No. PCT/US2020/017249 dated Dec. 10, 2020. 15 pages.

Gokoglu, S. A., Kuczmarski, M. A., Culley, D. E., and Raghu, S., 2011, "Numerical studies of an array of fluidic diverter actuators for flow control," AIAA-2011-3100, Proceedings of the 41st AIAA Fluid Dynamics Conference and Exhibit, Honolulu, HI.

International Search Report and Written Opinion issued by the International Searching Authority (ISA/EP) in PCT Application No. PCT/US2019/061505 dated Aug. 3, 2020. 12 pages.

International Search Report and Written Opinion issued by the International Searching Authority (ISA/EP) in PCT Application No. PCT/US2019/061506 dated Aug. 24, 2020. 16 pages.

International Search Report and Written Opinion issued by the International Searching Authority (ISA/US) in PCT Application No. No. PCT/US2020/034882 dated Nov. 17, 2020. 12 pages.

International Search Report and Written Opinion issued by the International Searching Authority (ISA/EP) in PCT Application No. PCT/US2020/017249 dated Feb. 12, 2021. 23 pages.

Culley, Dennis. "Variable frequency diverter actuation for flow control." 3rd AIAA Flow Control Conference. Jun. 5-8, 2006. San Francisco, CA. 12 pages.

Deere, Karen et al. "A Computational Study of a Dual Throat Fluidic Thrust Vectoring Nozzle Concept." 41st AIAA/ASME/SAE/ASEE Joint Propulsion Conference & Exhibit. 2005. 16 pages.

Gregory, James W. et al. "Variable-frequency fluidic oscillator driven by a piezoelectric bender." AIAA journal 47.11 (2009):2717-2725.

Tomac, Mehmet N. "Effect of Geometry Modifications on the Vectoring Performance of a Controlled Jet." Journal of Applied Fluid Mechanics, 10 (1), 2017. 9 pages.

Deere, Karen. "Summary of fluidic thrust vectoring research at NASA Langley Research Center." 21st AIAA applied aerodynamics conference. Jun. 23-26, 2003. Orlando, FL. 18 pages.

International Preliminary Report on Patentability. Issued by the International Bureau of WIPO in Application No. PCT/US2018/062812 dated Jun. 11, 2020. 9 pages.

Tesař, V., Zhong, S., and Rasheed, F., 2013, "New Fluidic-Oscillator Concept for Flow-Separation Control," AIAA Journal, vol. 51, No. 2, pp. 397-405.

International Search Report and Written Opinion issued by the International Searching Authority (ISA/US) in PCT Application No. PCT/US2018/062812 dated Feb. 21, 2019. 10 pages.

European Patent Office. Communication under Rule 71(3). Issued in European Application No. 19817513.5 dated Mar. 27, 2023. 63 pages.

U.S. Patent & Trademark Office. Non-Final Office Action. U.S. Appl. No. 17/614,135, dated Mar. 17, 2023. 45 pages.

(56) References Cited

OTHER PUBLICATIONS

Japanese Patent Office. Office Action issued in JP Application No. 2022-528015 dated Nov. 7, 2023. 4 pages, including English translation.
European Patent Office. Communication under Rule 71(3) EPC issued in European Application No. 18883610.0 dated Oct. 9, 2023. 8 pages.
European Patent Office. Communication under Rule 71(3). Issued in European Application No. 18883610.0 dated May 16, 2023. 8 pages.
European Patent Office. Extended European Search Report, issued in European Application No. 20813670.5 dated May 22, 2023. 9 pages.
U.S. Patent & Trademark Office. Notice of Allowance. U.S. Appl. No. 17/614,135, dated Aug. 21, 2023. 16 pages.
Japanese Patent Office. Office Action issued in JP Application No. 2022-528052 dated Aug. 16, 2023. 5 pages, including English translation.

* cited by examiner

VARIABLE CHARACTERISTICS FLUIDIC OSCILLATOR AND FLUIDIC OSCILLATOR WITH THREE DIMENSIONAL OUTPUT JET AND ASSOCIATED METHODS

CROSS REFERENCE TO RELATED APPLICATIONS

This application is a national stage application filed under 35 U.S.C. § 371 of PCT/US2018/062812 filed Nov. 28, 2018, which claims the benefit of U.S. Provisional Patent Application No. 62/591,476, filed Nov. 28, 2017, the content of which is incorporated herein by reference in its entirety.

BACKGROUND

Fluidic oscillators are a type of non-moving part, fluidic device that produce a pulsed or sweeping jet with a wide range of frequencies. They operate solely by employing fluid dynamic principles when supplied by a pressurized fluid. These devices are generally preferred in many engineering applications, since they can provide a wide range of frequencies, have a simple maintenance-free design without moving parts, and generate an output jet that is unsteady and spreads more than a regular jet. However, there are two main limitations with these devices that constrain their use. First, the frequency is a function of the flow rate, so for a given device and flow rate there will be one possible frequency outcome. However, different application scenarios require different frequencies for a given flow rate and oscillator. A second limitation is that a given oscillator has a fixed sweeping angle for a given flow rate. For a given fluidic oscillator, the sweeping angle does not change with the changes in flow rate. However, some applications may require a smaller or larger sweeping angle, or even time-varied sweeping angles. Thus, there is a need for a fluidic oscillator capable of altering its sweeping angle and frequency at a given flow rate.

Another problem with typical fluidic oscillators is that the oscillating output jet created with any fluidic oscillator is two-dimensional ("2D") by its nature. This constricts the use of fluidic oscillators where a three-dimensional ("3D") output jet is desired. Thus, there is a need for a fluidic oscillator that can create an oscillating fluid stream in a 3D space.

SUMMARY

Various implementations include a feedback-type fluidic oscillator. The fluidic oscillator includes a first portion, a second portion, and a middle portion. The middle portion is coupled between the first portion and the second portion. The middle portion includes an interaction chamber, a fluid supply inlet, an outlet nozzle, a first feedback channel, a second feedback channel, and at least one control port. The interaction chamber has a first attachment wall and a second attachment wall opposite and spaced apart from the first attachment wall. The fluid supply inlet is for introducing a fluid stream into the interaction chamber. The outlet nozzle is downstream of the fluid supply inlet, and the fluid stream exits the interaction chamber through the outlet nozzle. The first feedback channel is coupled to the first attachment wall, and the second feedback channel is coupled to the second attachment wall. The first feedback channel and second feedback channel are in fluid communication with the interaction chamber. Each of the first feedback channel and second feedback channel have a first end, a second end opposite and spaced apart from the first end, and an intermediate portion disposed between the first end and second end. The first ends are adjacent the outlet nozzle and the second ends are adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber. The at least one control port has a flow direction, and the at least one control port is for introducing a control fluid into the fluidic oscillator in the flow direction or suctioning the fluid stream from the fluidic oscillator in the flow direction. The fluidic oscillator also has a central axis extending from the fluid supply inlet to the outlet nozzle.

In some implementations, the at least one control port includes a first control port and a second control port.

In some implementations, the first control port is defined by the first attachment wall and the second control port is defined by the second attachment wall. In some implementations, the flow directions of the first and second control ports are oriented toward the outlet nozzle and angled away from the central axis. In some implementations, the flow directions of the first and second control ports are oriented toward the outlet nozzle and parallel to the central axis. In some implementations, the flow directions of the first and second control ports are oriented toward the outlet nozzle and angled toward the central axis. In some implementations, the flow directions of the first and second control ports are oriented toward the fluid supply inlet and angled toward the central axis.

In some implementations, the first control port is defined by a wall of the first feedback channel and the second control port is defined by a wall of the second feedback channel.

In some implementations, the first control port is defined by a wall of the interaction chamber disposed between the first end of the first feedback channel and the outlet nozzle and the second control port is defined by a wall of the interaction chamber disposed between the first end of the second feedback channel and the outlet nozzle.

In some implementations, the first and second control ports are defined by the first portion and are in direct fluid communication with the interaction chamber.

In some implementations, the first control port is defined by the first portion and the second control port is defined by the second portion, the flow direction of the first control port being coincident with, and opposite, the flow direction of the second control port.

Various other implementations include a jet interaction-type fluidic oscillator. The fluidic oscillator includes a first portion, a second portion, and a middle portion. The middle portion is coupled between the first portion and the middle portion. The middle portion includes an interaction chamber, a first fluid supply inlet, a second fluid supply inlet, an outlet nozzle, and at least one control port. The interaction chamber has a first wall, a second wall, and a middle wall. The first, second, and middle walls each have a first edge and a second edge spaced apart from the first edge. The first fluid supply inlet is for introducing a first fluid stream into the interaction chamber. The first fluid supply inlet is disposed between the second edge of the first wall and the first edge of the middle wall. The second fluid supply inlet is for introducing a second fluid stream into the interaction chamber. The second fluid supply inlet is disposed between the second edge of the middle wall and the first edge of the second wall. The outlet nozzle is downstream of the first and second fluid supply inlets. The first and second fluid streams exit the interaction chamber through the outlet nozzle. The at least one control port has a flow direction, and the at least one control port is for introducing a control fluid into the fluidic oscillator in the flow direction or suctioning the first and second fluid streams from the fluidic oscillator in the flow direction. The fluidic oscillator also has a central axis extending from the middle wall to the outlet nozzle.

In some implementations, the at least one control port includes a first control port and a second control port.

In some implementations, the first control port is defined by the first wall and the second control port is defined by the second wall.

In some implementations, the first and second control ports are defined by the middle wall.

In some implementations, the first and second control ports are defined by the first portion.

In some implementations, the first control port is defined by the first portion and the second control port is defined by the second portion, the flow direction of the first control port being coincident with, and opposite, the flow direction of the second control port.

Various other implementations include a fluidic oscillator. The fluidic oscillator includes a first portion, a second portion, and a middle portion coupled between the first portion and the middle portion. The middle portion includes an interaction chamber, a fluid supply inlet, an outlet nozzle, a first control port, and a second control port. The fluid supply inlet is for introducing a fluid stream into the interaction chamber. The outlet nozzle is disposed at the second end of the middle portion and is downstream of the fluid supply inlet. A fluid stream exits the interaction chamber through the outlet nozzle. The outlet nozzle has a first end, a second end, and a narrowest portion disposed between the first end of the outlet nozzle and the second end of the outlet nozzle. The narrowest portion of the outlet nozzle has a smallest inner area in a plane parallel to the second end of the middle portion. The first end of the outlet nozzle is closer than the second end of the outlet nozzle to the fluid supply inlet. The first control port and the second control port each have a flow direction. The first control port and the second control port are for introducing a control fluid into the fluidic oscillator in the flow direction or suctioning the fluid stream from the fluidic oscillator in the flow direction. The first control port is defined by the first portion, and the second control port is defined by the second portion. The first and second control ports are disposed on, and in fluid communication with, the outlet nozzle.

In some implementations, the first and second control ports are defined by the outlet nozzle.

In some implementations, the first and second control ports are disposed between the first end of the outlet nozzle and the narrowest portion of the outlet nozzle.

In some implementations, the first and second control ports are disposed between the second end of the outlet nozzle and the narrowest portion of the outlet nozzle.

In some implementations, the at least one control port further includes a third control port and a fourth control port, wherein the third control port is defined by a first outlet nozzle side wall and the fourth control port is defined by a second outlet nozzle side wall opposite the first outlet nozzle side wall.

In some implementations, the first and second control ports continuously introduce the control fluid or continuously suction the fluid stream.

In some implementations, the first and second control ports alternate introducing the control fluid periodically or alternate suctioning the fluid stream periodically.

In some implementations, the first and second control ports are controlled by another fluidic oscillator.

In some implementations, the first control port includes a first plurality of control ports and the second control port includes a second plurality of control ports In some implementations, the first and second pluralities of control ports are disposed between the first end of the outlet nozzle and the narrowest portion of the outlet nozzle.

In some implementations, the first and second pluralities of control ports are disposed between the second end of the outlet nozzle and the narrowest portion of the outlet nozzle.

In some implementations, the fluidic oscillator further includes a third plurality of control ports and a fourth plurality of control ports. The third plurality of control ports is defined by a first outlet nozzle side wall and the fourth plurality of control ports is defined by a second outlet nozzle side wall opposite the first outlet nozzle side wall.

In some implementations, the first and second pluralities of control ports continuously introduce the control fluid or continuously suction the fluid stream.

In some implementations, the first and second pluralities of control ports alternate introducing the control fluid periodically or alternate suctioning the fluid stream periodically.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1B:
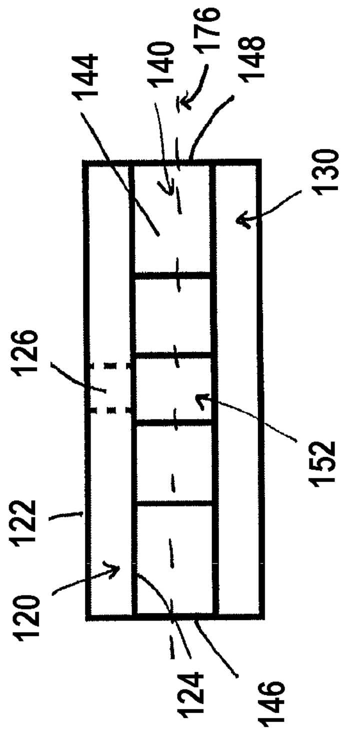
FIG. 1B (PRIOR ART)
FIG. 1B is an end view of the feedback-type fluidic oscillator of FIG. 1A.

Various implementations include a feedback-type fluidic oscillator. The fluidic oscillator includes a first portion, a second portion, and a middle portion. The middle portion is coupled between the first portion and the second portion. The middle portion includes an interaction chamber, a fluid supply inlet, an outlet nozzle, a first feedback channel, a second feedback channel, and at least one control port. The interaction chamber has a first attachment wall and a second attachment wall opposite and spaced apart from the first attachment wall. The fluid supply inlet is for introducing a fluid stream into the interaction chamber. The outlet nozzle is downstream of the fluid supply inlet, and the fluid stream exits the interaction chamber through the outlet nozzle. The first feedback channel is coupled to the first attachment wall, and the second feedback channel is coupled to the second attachment wall. The first feedback channel and second feedback channel are in fluid communication with the interaction chamber. Each of the first feedback channel and second feedback channel have a first end, a second end opposite and spaced apart from the first end, and an intermediate portion disposed between the first end and second end. The first ends are adjacent the outlet nozzle and the second ends are adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber. The at least one control port has a flow direction, and the at least one control port is for introducing a control fluid into the fluidic oscillator in the flow direction or suctioning the fluid stream from the fluidic oscillator in the flow direction. The fluidic oscillator also has a central axis extending from the fluid supply inlet to the outlet nozzle.

Various other implementations include a jet interaction-type fluidic oscillator. The fluidic oscillator includes a first portion, a second portion, and a middle portion. The middle portion is coupled between the first portion and the middle portion. The middle portion includes an interaction chamber, a first fluid supply inlet, a second fluid supply inlet, an outlet nozzle, and at least one control port. The interaction chamber has a first wall, a second wall, and a middle wall. The first, second, and middle walls each have a first edge and a second edge spaced apart from the first edge. The first fluid supply inlet is for introducing a first fluid stream into the interaction chamber. The first fluid supply inlet is disposed between the second edge of the first wall and the first edge of the middle wall. The second fluid supply inlet is for introducing a second fluid stream into the interaction chamber. The second fluid supply inlet is disposed between the second edge of the middle wall and the first edge of the second wall. The outlet nozzle is downstream of the first and second fluid supply inlets. The first and second fluid streams exit the interaction chamber through the outlet nozzle. The at least one control port has a flow direction, and the at least one control port is for introducing a control fluid into the fluidic oscillator in the flow direction or suctioning the first and second fluid streams from the fluidic oscillator in the flow direction. The fluidic oscillator also has a central axis extending from the middle wall to the outlet nozzle.

Various other implementations include a fluidic oscillator. The fluidic oscillator includes a first portion, a second portion, and a middle portion coupled between the first portion and the middle portion. The middle portion includes an interaction chamber, a fluid supply inlet, an outlet nozzle, a first control port, and a second control port. The fluid supply inlet is for introducing a fluid stream into the interaction chamber. The outlet nozzle is disposed at the second end of the middle portion and is downstream of the fluid supply inlet. A fluid stream exits the interaction chamber through the outlet nozzle. The outlet nozzle has a first end, a second end, and a narrowest portion disposed between the first end of the outlet nozzle and the second end of the outlet nozzle. The narrowest portion of the outlet nozzle has a smallest inner area in a plane parallel to the second end of the middle portion. The first end of the outlet nozzle is closer than the second end of the outlet nozzle to the fluid supply inlet. The first control port and the second control port each have a flow direction. The first control port and the second control port are for introducing a control fluid into the fluidic oscillator in the flow direction or suctioning the fluid stream from the fluidic oscillator in the flow direction. The first control port is defined by the first portion, and the second control port is defined by the second portion. The first and second control ports are disposed on, and in fluid communication with, the outlet nozzle.

Figure 1A:
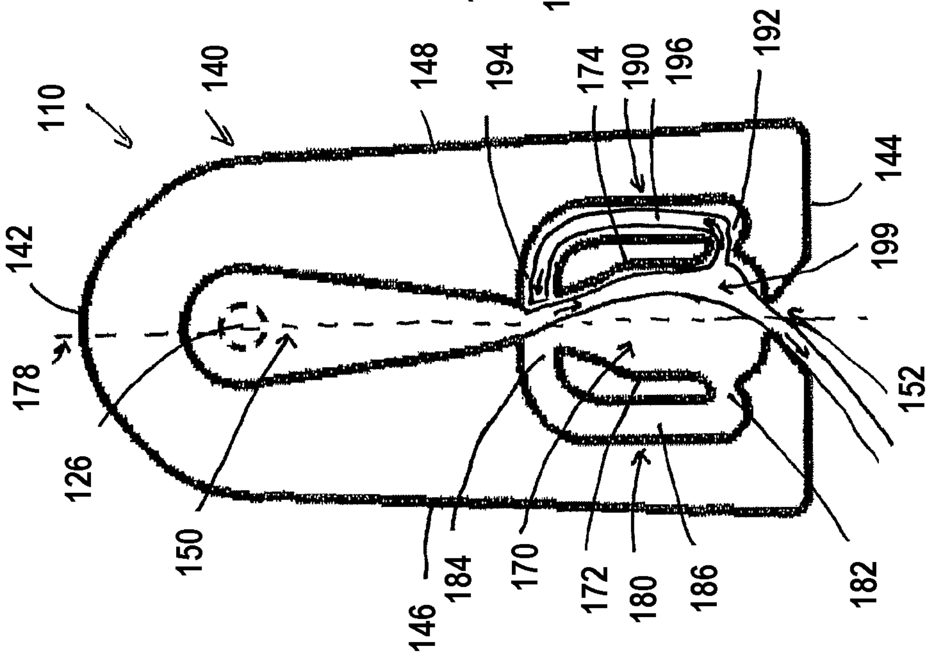
FIG. 1A (PRIOR ART)
FIG. 1A is a top view of a feedback-type fluidic oscillator of the prior art.

FIG. 1A shows a top view of a feedback-type fluidic oscillator 110 known in the art, and FIG. 1B shows an end view of the feedback-type fluidic oscillator 110 as viewed from the second end 144 of the middle portion 140. The fluidic oscillator 110 includes a first portion 120, a second portion 130, and a middle portion 140 disposed between the first portion 120 and the second portion 130. The middle portion 140 has a first end 142 and a second end 144 opposite and spaced apart from the first end 142, and a first side 146 and a second side 148 opposite and spaced apart from the first side 146. The middle portion 140 is structured such that, when the middle portion 140 is disposed between the first portion 120 and the second portion 130, openings are defined by the walls of the middle portion 140. The openings in the middle portion 140 of the fluidic oscillator 110 include an interaction chamber 170, a fluid supply inlet 150, an outlet nozzle 152, a first feedback channel 180, and a second feedback channel 190. The middle portion 140 of the fluidic oscillator 110 also includes a central axis 178 extending between the fluid supply inlet 150 and the outlet nozzle 152.

The first portion 120 of the fluidic oscillator 110 has a first side 122 and a second side 124 opposite and spaced apart from the first side 122, and the first portion 120 defines an inlet port 126 extending from the first side 122 of the first portion 120 to the second side 124 of the first portion 120. The fluid supply inlet 150 of the middle portion 140 is located adjacent the first end 142 of the middle portion 140, and the inlet port 126 is aligned with the fluid supply inlet 150 such that the inlet port 126 and the fluid supply inlet 150 are in fluid communication with each other.

The outlet nozzle 152 is located adjacent the second end 144 of the middle portion 140, downstream of the fluid supply inlet 150, as discussed below. The outlet nozzle 152 extends from the second end 144 of the middle portion 140 toward the first end 142 of the middle portion 140.

The interaction chamber 170 is located between, and is in fluid communication with, the fluid supply inlet 150 and the outlet nozzle 152. The interaction chamber 170 has a first attachment wall 172 and a second attachment wall 174 that is opposite and spaced apart from the first attachment wall 172. The interaction chamber 170 also has an interaction chamber plane 176 extending between the first attachment wall 172 and the second attachment wall 174 and parallel to the interaction chamber plane 176. The first attachment wall 172 and second attachment wall 174 mirror each other across a plane intersecting the central axis 178 and perpendicular to the interaction chamber plane 176. Each attachment wall 172, 174 has a curvature such that the first attachment wall 172 and second attachment wall 174 are closer to each other adjacent the fluid supply inlet 150 than adjacent the outlet nozzle 152.

The first feedback channel 180 and the second feedback channel 190 each have a first end 182, 192, a second end 184, 194 opposite and spaced apart from the first end 182, 192, and an intermediate portion 186, 196 disposed between the first end 182, 192 and second end 184, 194. The first feedback channel 180 is coupled to the first attachment wall 172 and the second feedback channel 190 is coupled to the second attachment wall 174 such that both the first feedback channel 180 and the second feedback channel 190 are in fluid communication with the interaction chamber 170. The first end 182, 192 of both feedback channels 180, 190 is adjacent the outlet nozzle 152 such that the first ends 182, 192 of the feedback channels 180, 190 are closer than the second ends 184, 194 of the feedback channels 180, 190 to the outlet nozzle 152. The second end 184, 194 of both feedback channels 180, 190 is adjacent the fluid supply inlet 150 such that the second ends 184, 194 of the feedback channels 180, 190 are closer than the first ends 182, 192 of the feedback channels 180, 190 to the fluid supply inlet 150.

A fluid stream 199 enters the fluidic oscillator 110 through the inlet port 126 and flows through the fluid supply inlet 150, through the interaction chamber 170, and exits the fluidic oscillator 110 through the outlet nozzle 152. The first attachment wall 172 and second attachment wall 174 of the interaction chamber 170 are a predetermined distance from each other such that, as the fluid stream 199 flows through the interaction chamber 170, a pressure difference across the fluid stream 199 causes the fluid stream 199 to deflect toward, and eventually attach to, either the first attachment wall 172 or the second attachment wall 174 due to the Coanda effect. The first attachment wall 172 and second attachment wall 174 of the interaction chamber 170 are shaped to allow fluid from the fluid stream 199 to flow into the first ends 182, 192 of the first feedback channel 180 and second feedback channel 190, respectively, when the fluid stream 199 is attached to that attachment wall 172, 174. The fluid stream 199 can include any fluid, for example, any liquid or gas.

When the fluid stream 199 is attached to the first attachment wall 172, fluid from the fluid stream 199 enters the first end 182 of the first feedback channel 180, flows through the intermediate portion 186 of the first feedback channel 180 and out of the second end 184 of the first feedback channel 180. The fluid exiting the second end 184 of the first feedback channel 180 contacts the fluid stream 199 adjacent the fluid supply inlet 150, causing the fluid stream 199 to detach from the first attachment wall 172 and attach to the second attachment wall 174. Fluid from the fluid stream 199 then enters the first end 192 of the second feedback channel 190, flows through the intermediate portion 196 of the second feedback channel 190 and out of the second end 194 of the second feedback channel 190. The fluid exiting the second end 194 of the second feedback channel 190 contacts the fluid stream 199 adjacent the fluid supply inlet 150, causing the fluid stream 199 to detach from the second attachment wall 174 and attach back to the first attachment wall 172. The fluid stream 199 continues to oscillate between attachment to the first attachment wall 172 and second attachment wall 174 of the interaction chamber 170.

Because of the shape of the outlet nozzle 152 and the curvature of the first attachment wall 172 and second attachment wall 174, the oscillation of the fluid stream 199 between the first attachment wall 172 and the second attachment wall 174 causes the fluid stream 199 to oscillate in a plane parallel to the interaction chamber plane 176 as the fluid stream 199 exits the fluidic oscillator 110 through the outlet nozzle 152.

Figure 2:
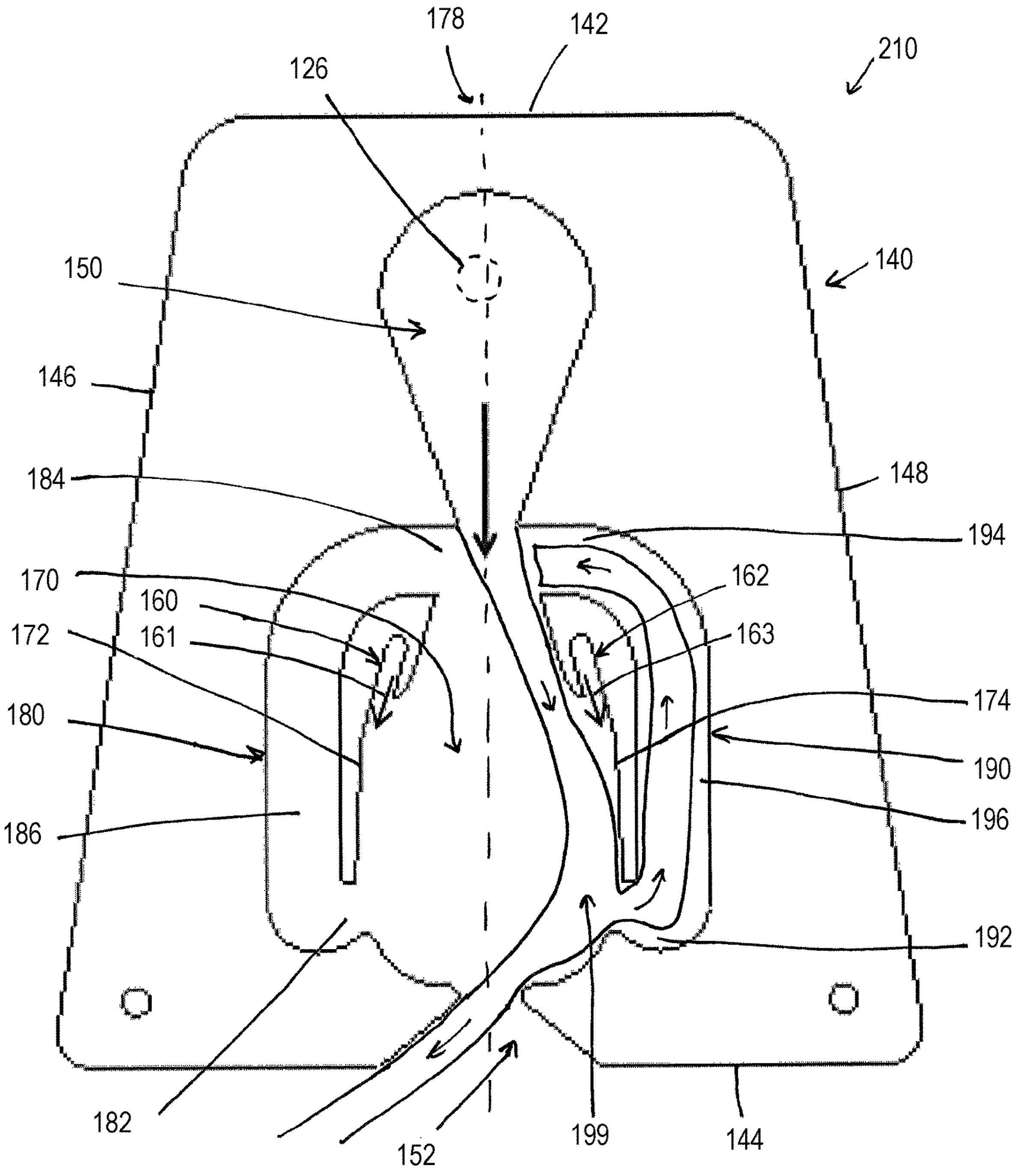
FIG. 2 is a top view of a feedback-type fluidic oscillator including two control ports, according to one implementation.

FIG. 2 shows one example of a feedback-type fluidic oscillator 210 according to an implementation of the current application. The fluidic oscillator 210 of FIG. 2 is similar to the fluidic oscillator 110 shown in FIG. 1, but the fluidic oscillator 210 includes a first control port 160 and a second control port 162. The first control port 160 has a flow direction 161 and the second control port 162 has a flow direction 163 from which the first control port 160 and the second control port 162 introduce a control fluid into the fluidic oscillator 210. However, in other implementations, the first and second fluidic oscillators still have a flow direction but create a suction in the fluidic oscillator rather than introduce a control fluid. The suction from the first and second control ports in these implementations removes a portion of the fluid stream from the fluidic oscillator in the flow direction. In all implementations discussed herein, the introduction of control fluid from (or the suction from) the control ports 160, 162 can be continuous, time varied (e.g., periodic), or port varied (e.g., one control port can be continuous with the other control port being periodic, or one control port being introducing a control fluid with the other control port suctioning).

In the fluidic oscillator 210 of FIG. 2, the first control port 160 is defined by the first attachment wall 172, and the second control port 162 is defined by the second attachment wall 174. The flow directions 161, 163 of the first and second control ports 160, 162 are oriented toward the outlet nozzle 152 and angled away from the central axis 178, such that the flow directions 161, 163 of the first and second control ports 160, 162 are both in a plane parallel to the interaction chamber plane 176.

Various advantages are realized through the inclusion and use of the control ports. As the control fluid being introduced into (or a portion of the fluid stream is suctioned from) the fluidic oscillator is varied, the frequency and sweeping angle of the fluid stream exiting the fluidic oscillator is varied. Thus, the frequency and sweeping angle of the exiting fluid stream can be varied for a given flow rate and for a given fluidic oscillator while no moving parts are added to the system. Since no moving parts are involved, the device needs much less maintenance and the cost is lower. Based on the location of the control ports, up to five times (5×) more frequency can be obtained for the given flow rate and oscillator. For the implementation of the fluidic oscillator shown in FIG. 2, an 8× increase in oscillation frequency can be obtained while the sweeping angle decreases. Thus, a single fluidic oscillator design can provide the same outputs as many different fluidic oscillator designs.

In the implementations described herein, circular ports are used for control ports defined by upper and lower surfaces and rectangular ports are used for control ports defined by side surfaces. However, the port shape shown is arbitrary based on desired effect, and in other implementations, the control port shape may be circular, rectangular, square, oval, triangular, rhombus, trapezoid, pentagon, hexagon, or any other shape capable of introducing a fluid into, or suctioning fluid from the fluidic oscillator.

Figure 3:
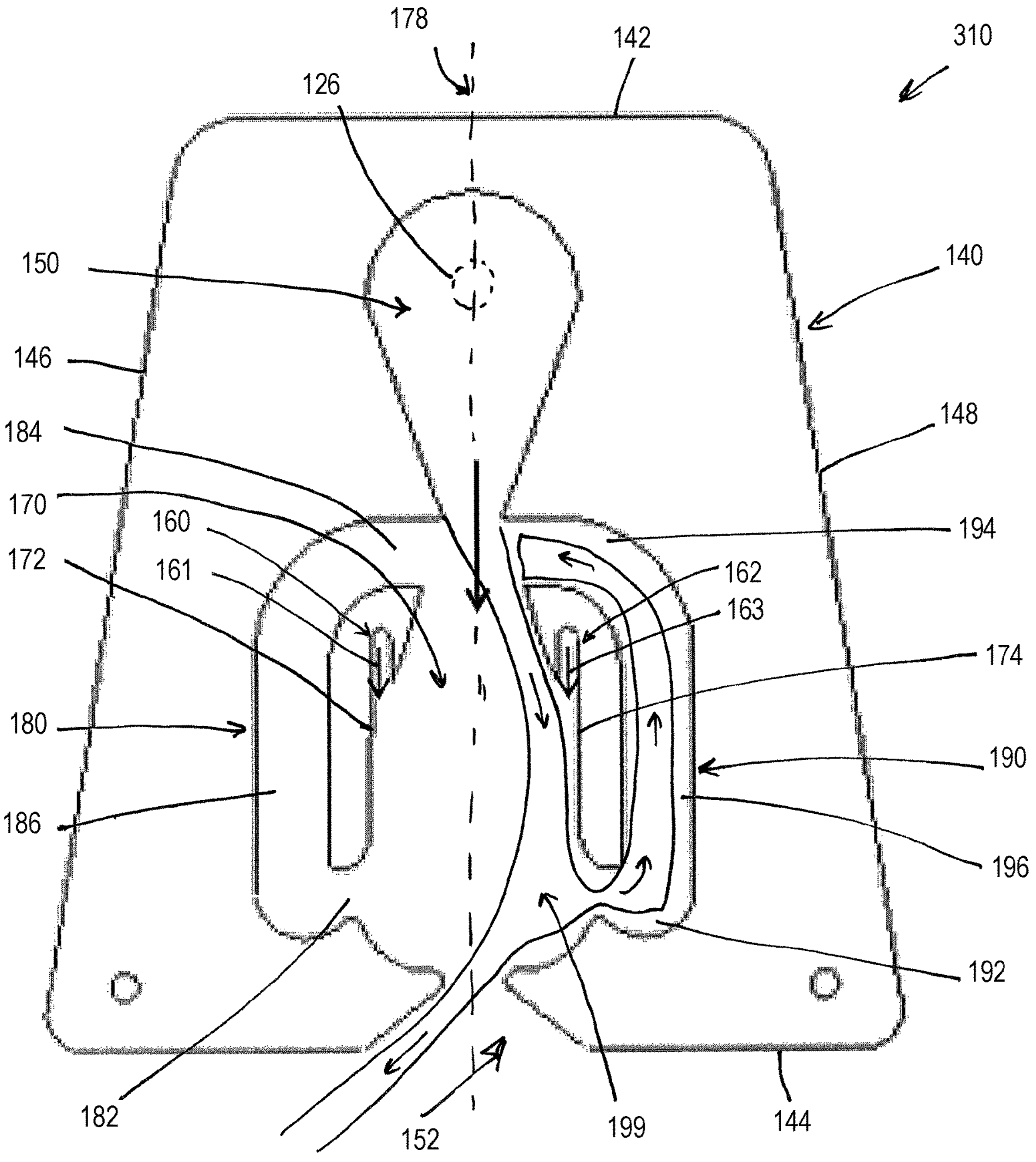
FIG. 3 is a top view of a feedback-type fluidic oscillator including two control ports, according to another implementation.

FIG. 3 shows another implementation of a feedback-type fluidic oscillator 310 similar to the fluidic oscillator 210 shown in FIG. 2 with the first and second control ports 160, 162 being defined by the first and second attachment walls 172, 174, respectively. However, in the fluidic oscillator 310 shown in FIG. 3, the flow directions 161, 163 of the first and second control ports 160, 162 are oriented toward the outlet nozzle 152 and parallel to the central axis 178, such that the flow directions 161, 163 of the first and second control ports 160, 162 are both in a plane parallel to the interaction chamber plane 176.

Figure 4:
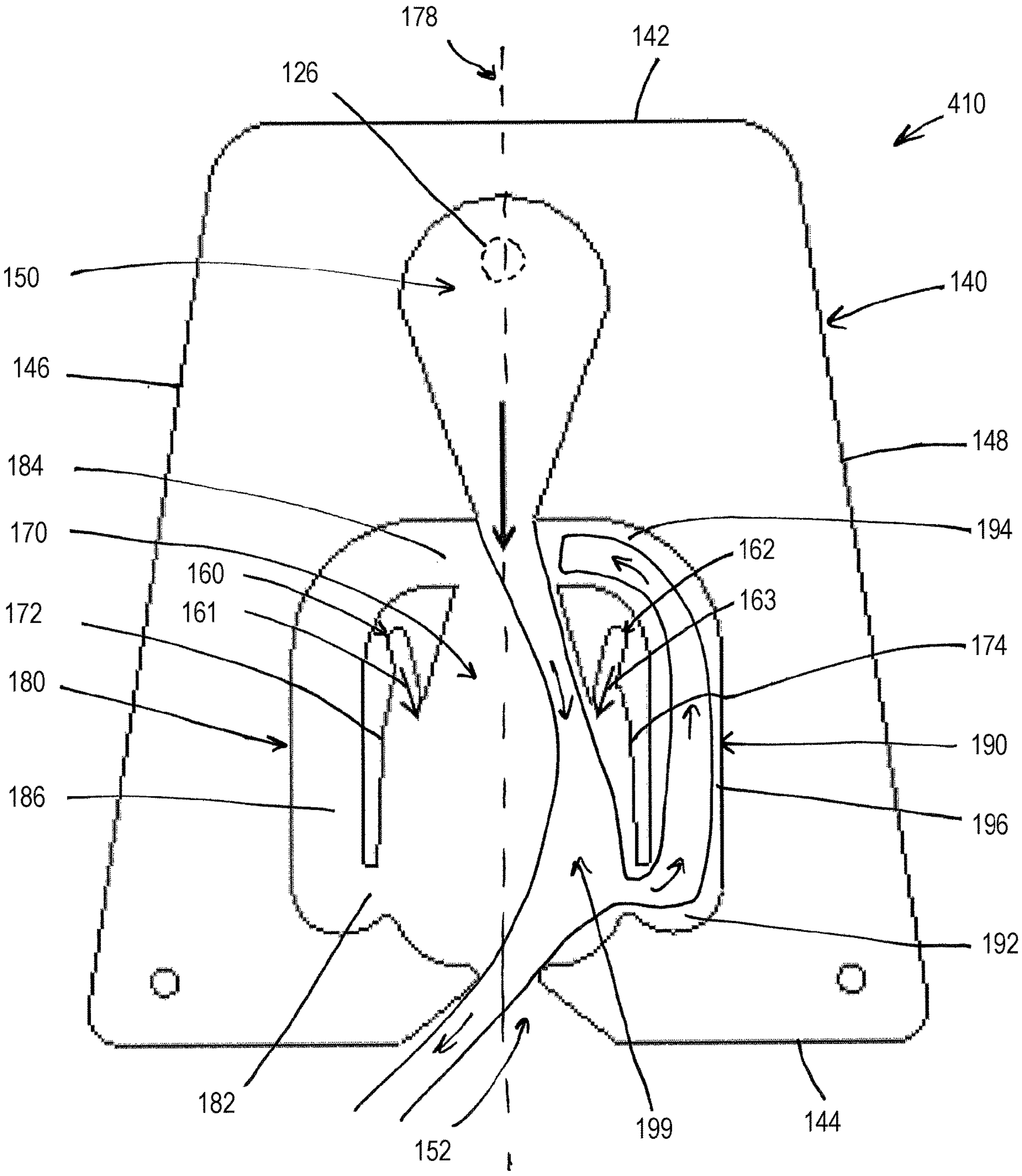
FIG. 4 is a top view of a feedback-type fluidic oscillator including two control ports, according to another implementation.

FIG. 4 shows another implementation of a feedback-type fluidic oscillator 410 similar to the fluidic oscillator 210 shown in FIG. 2 with the first and second control ports 160, 162 being defined by the first and second attachment walls 172, 174, respectively. However, in the fluidic oscillator 410 shown in FIG. 4, the flow directions 161, 163 of the first and second control ports 160, 162 are oriented toward the outlet nozzle 152 and angled toward the central axis 178, such that the flow directions 161, 163 of the first and second control ports 160, 162 are both in a plane parallel to the interaction chamber plane 176.

Figure 5:
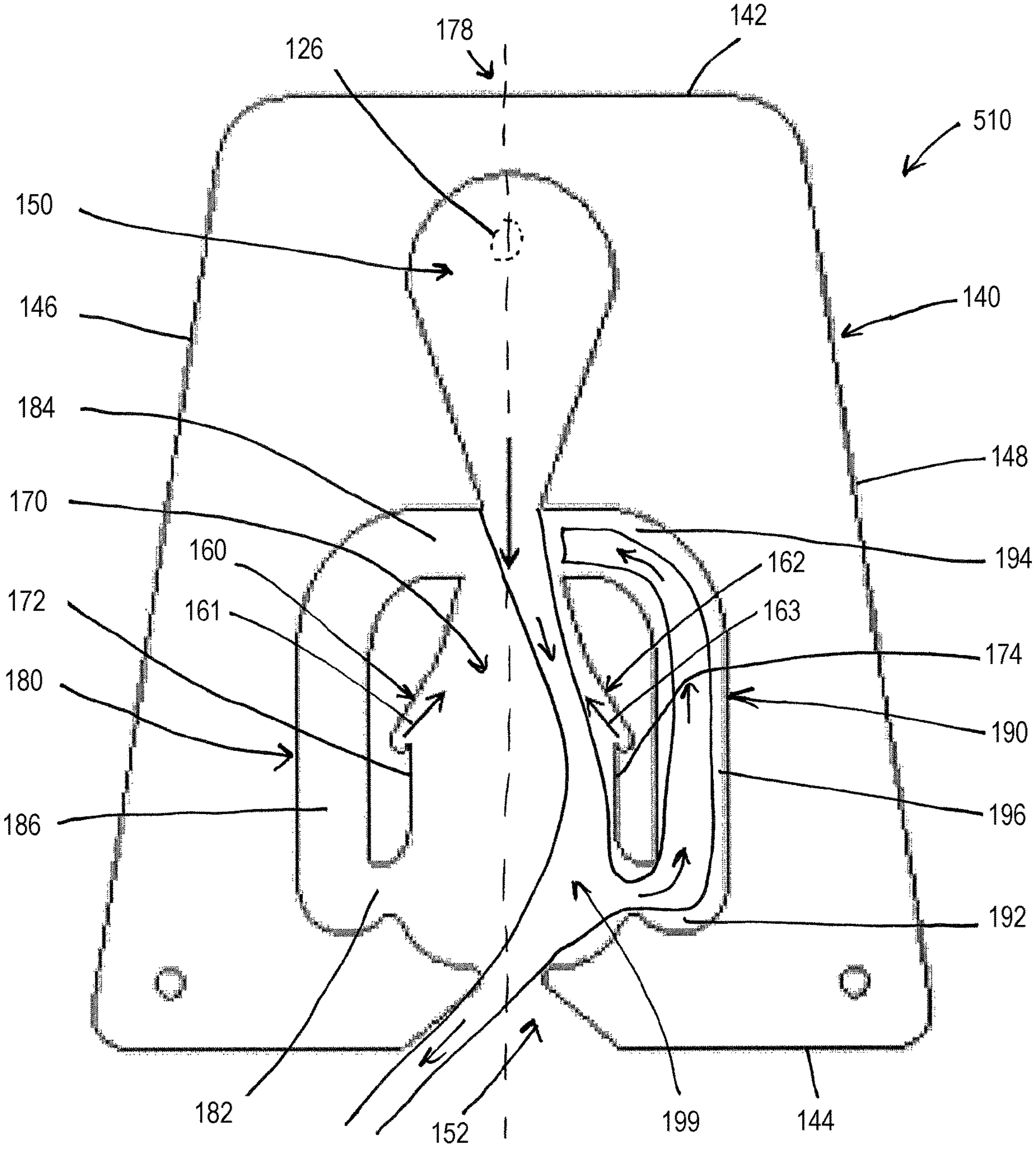
FIG. 5 is a top view of a feedback-type fluidic oscillator including two control ports, according to another implementation.

FIG. 5 shows another implementation of a feedback-type fluidic oscillator 510 similar to the fluidic oscillator 210 shown in FIG. 2 with the first and second control ports 160, 162 being defined by the first and second attachment walls 172, 174, respectively. However, in the fluidic oscillator 510 shown in FIG. 5, the flow directions 161, 163 of the first and second control ports 160, 162 are oriented toward the fluid supply inlet 150 and angled toward the central axis 178, such that the flow directions 161, 163 of the first and second control ports 160, 162 are both in a plane parallel to the interaction chamber plane 176.

Figure 6:
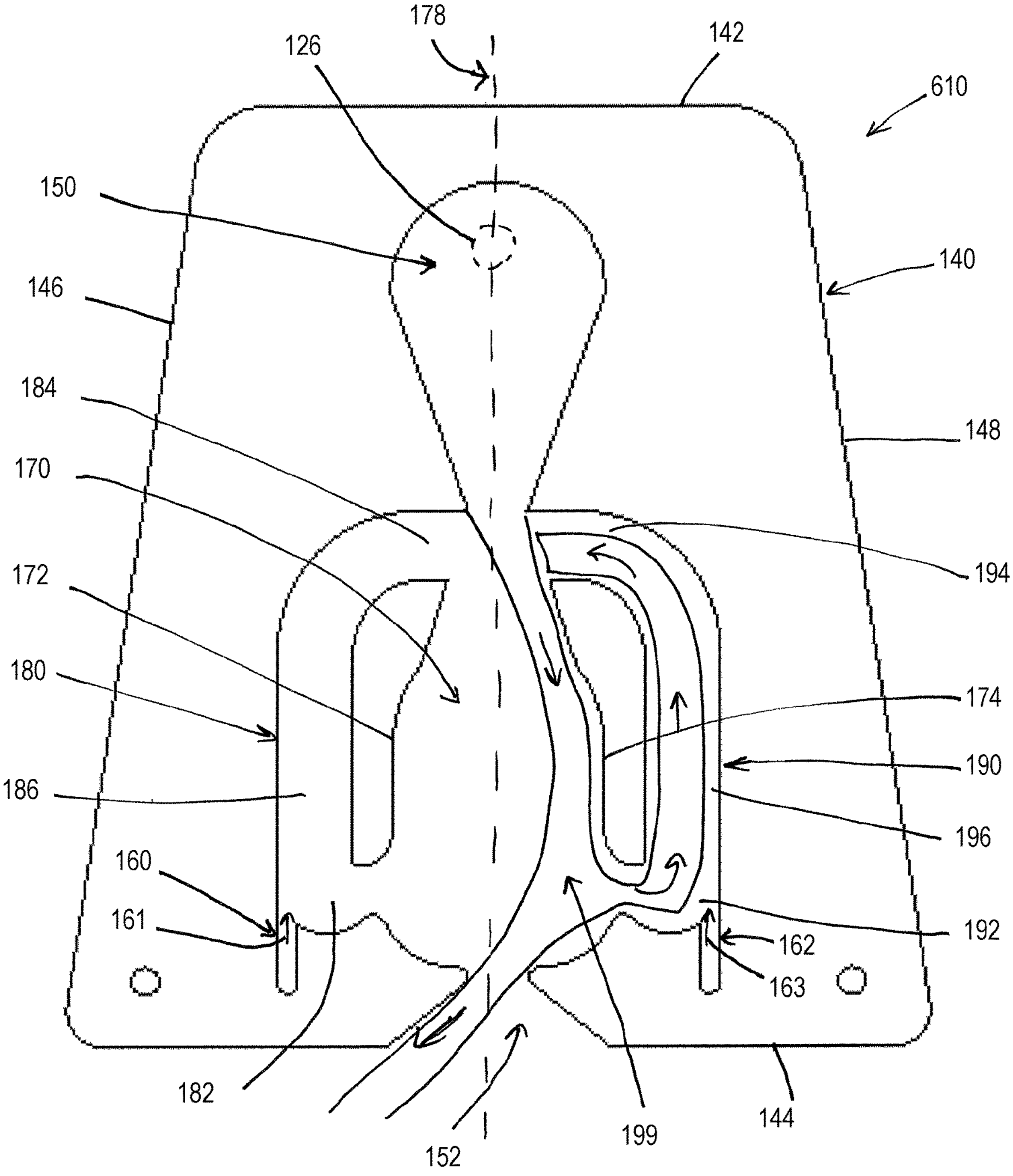
FIG. 6 is a top view of a feedback-type fluidic oscillator including two control ports, according to another implementation.

FIG. 6 shows yet another implementation of a feedback-type fluidic oscillator 610 similar to the fluidic oscillators shown in FIG. 2-5, but in this implementation the first control port 160 is defined by a wall of the first feedback channel 180 and the second control port 162 is defined by a wall of the second feedback channel 190. The first and second control ports 160, 162 are defined by a portion of the first and second feedback channels 180, 190, respectively, adjacent the first ends 182, 192 of the feedback channels 180, 190. The flow directions 161, 163 of the first and second control ports 160, 162 are oriented toward the fluid supply inlet 150 and parallel to the central axis 178, such that the flow directions 161, 163 of the first and second control ports 160, 162 are both in a plane parallel to the interaction chamber plane 176.

Figure 7:
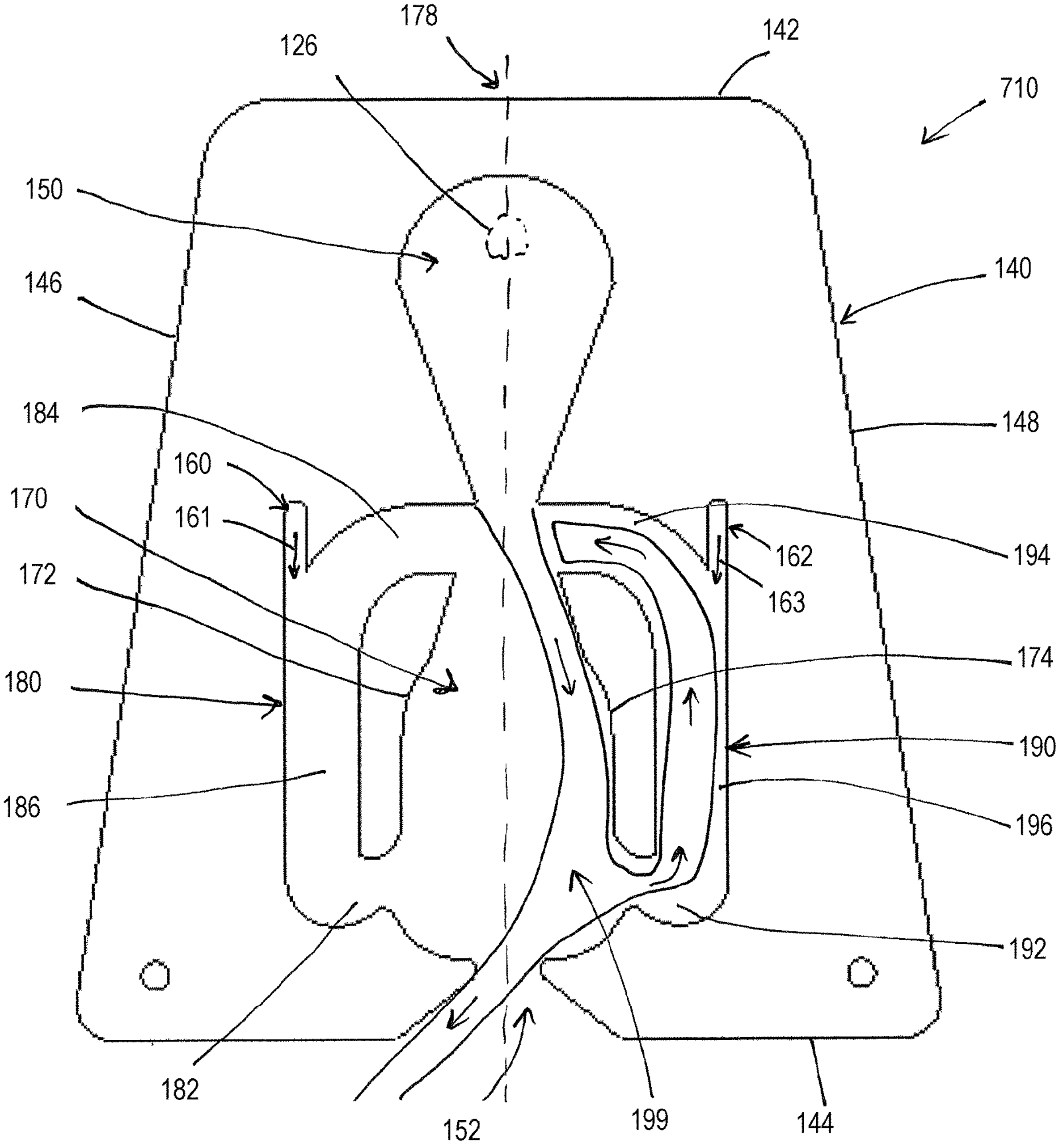
FIG. 7 is a top view of a feedback-type fluidic oscillator including two control ports, according to another implementation.

FIG. 7 shows another implementation of a feedback-type fluidic oscillator 710 similar to the fluidic oscillator 610 shown in FIG. 6 with the first and second control ports 160, 162 being defined by the first and second feedback channels 180, 190, respectively. However, in the fluidic oscillator 710 shown in FIG. 7, the first and second control ports 160, 162 are defined by a portion of the first and second feedback channels 180, 190, respectively, adjacent the second ends 184, 194 of the feedback channels 180, 190. The flow directions 161, 163 of the first and second control ports 160, 162 are oriented toward the outlet nozzle 152 and parallel to the central axis 178, such that the flow directions 161, 163 of the first and second control ports 160, 162 are both in a plane parallel to the interaction chamber plane 176.

Figure 8:
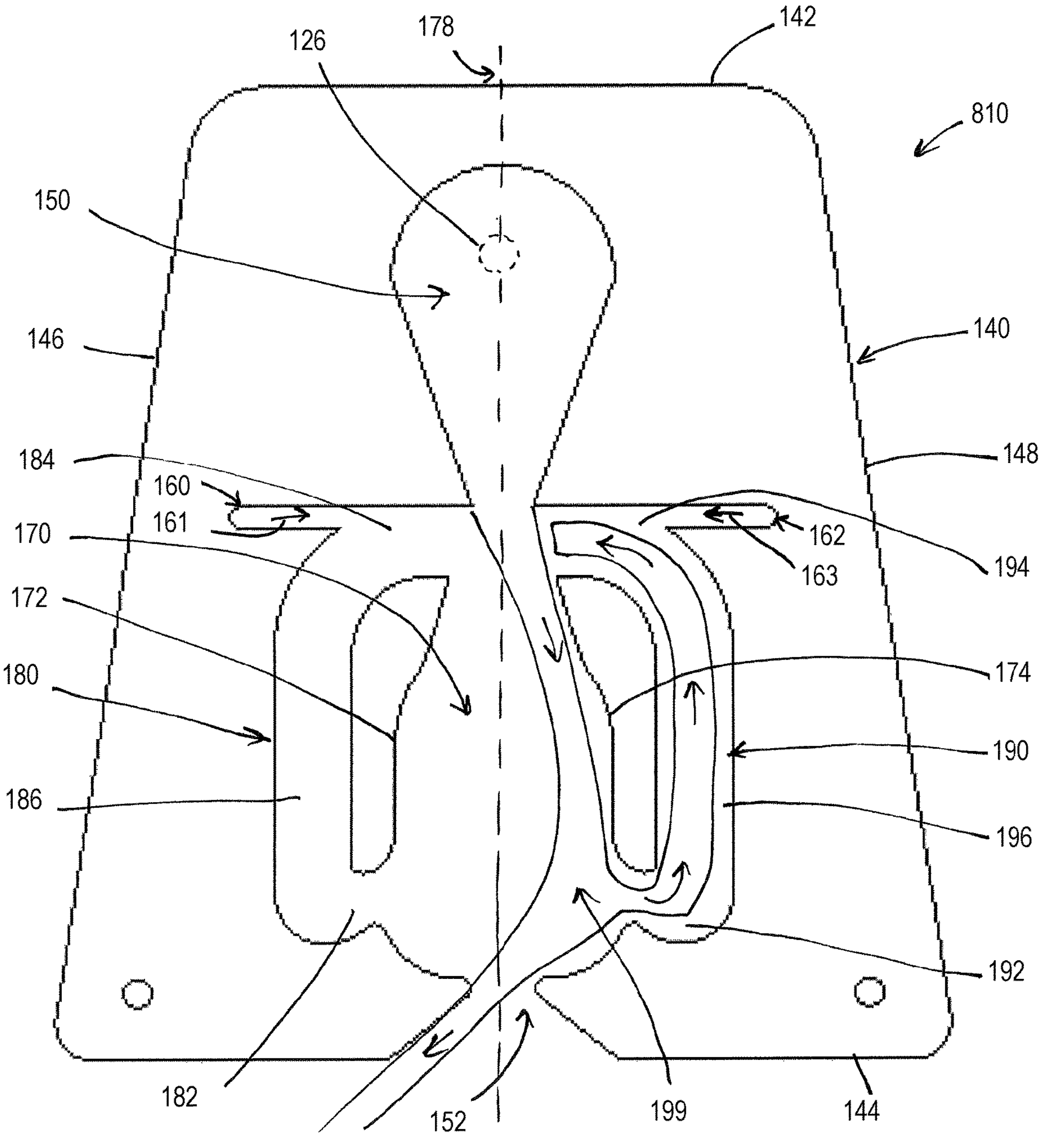
FIG. 8 is a top view of a feedback-type fluidic oscillator including two control ports, according to another implementation.

FIG. 8 shows another implementation of a feedback-type fluidic oscillator 810 similar to the fluidic oscillator 610 shown in FIG. 6 with the first and second control ports 160, 162 being defined by the first and second feedback channels 180, 190, respectively. However, in the fluidic oscillator 810 shown in FIG. 8, the first and second control ports 160, 162 are defined by a portion of the first and second feedback channels 180, 190, respectively, adjacent the second ends 194, 184 of the feedback channels 180, 190. The flow directions 161, 163 of the first and second control ports 160, 162 are oriented toward and perpendicular to the central axis 178, such that the flow directions 161, 163 of the first and second control ports 160, 162 are both in a plane parallel to the interaction chamber plane 176.

Figure 9A:
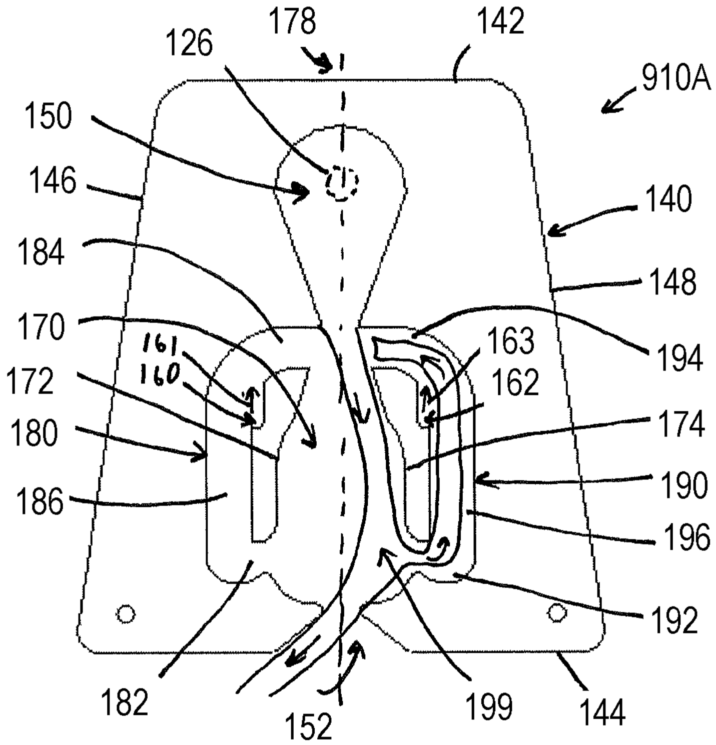
FIGS. 9A and 9B are top views of feedback-type fluidic oscillators including two control ports, according to other implementations.
Figure 9B:
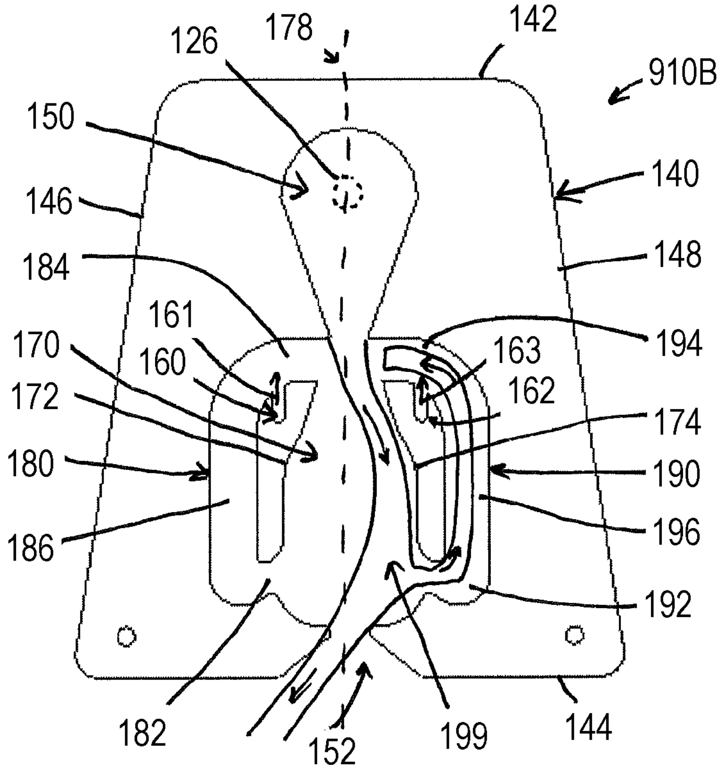

FIGS. 9A and 9B show other implementations of feed-back-type fluidic oscillators 910A, 910B similar to the fluidic oscillator 610 shown in FIG. 6 with the first and second control ports 160, 162 being defined by the first and second feedback channels 180, 190, respectively. However, in the fluidic oscillators 910A, 910B shown in FIGS. 9A and 9B, the first and second control ports 160, 162 are defined by a portion of the first and second feedback channels 180, 190, respectively, adjacent the second ends 184, 194 of the feedback channels 180, 190. The flow directions 161, 163 of the first and second control ports 160, 162 are oriented toward the fluid supply inlet 150 and parallel to the central axis 178, such that the flow directions 161, 163 of the first and second control ports 160, 162 are both in a plane parallel to the interaction chamber plane 176.

Figure 10:
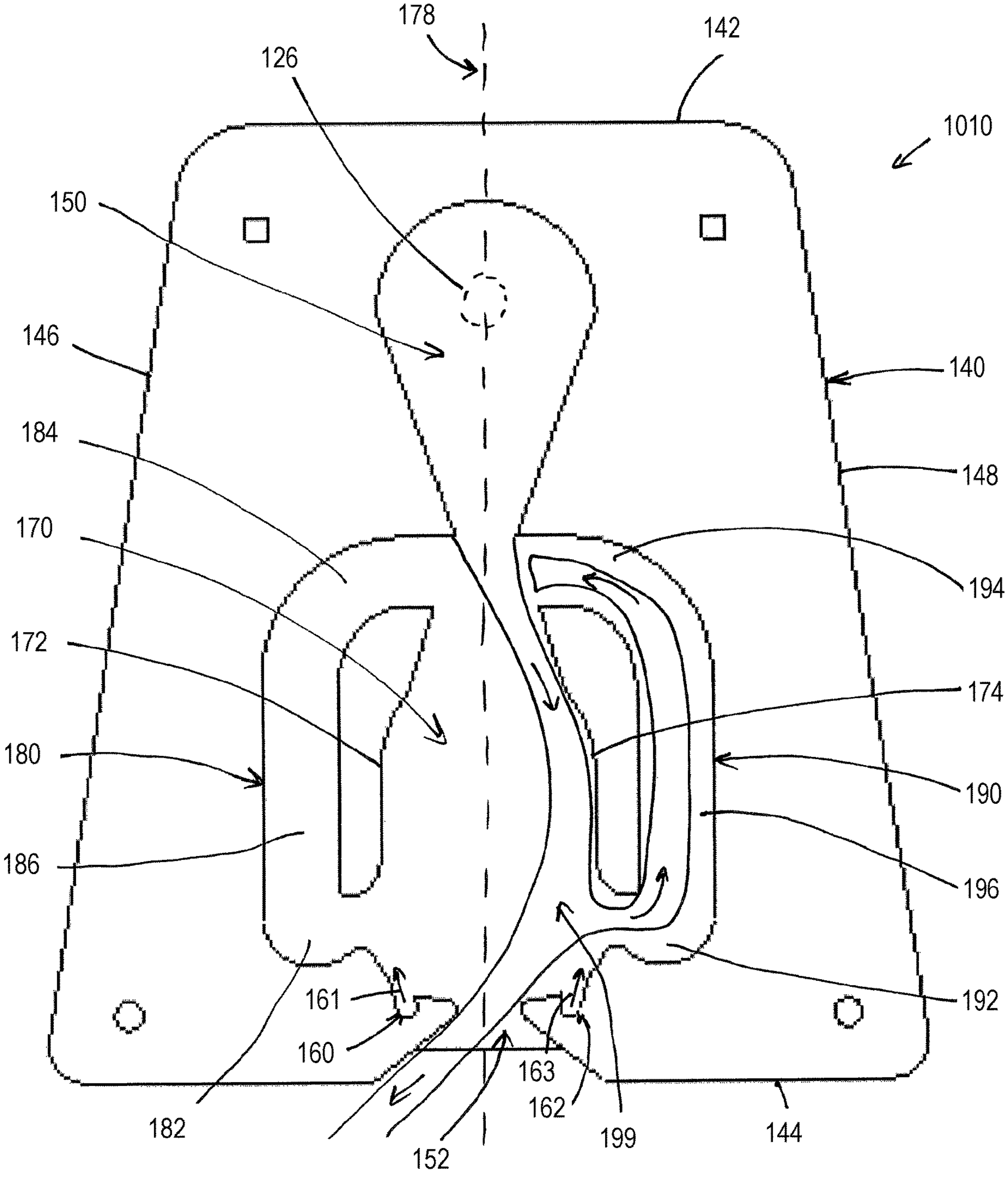
FIG. 10 is a top view of a feedback-type fluidic oscillator including two control ports, according to another implementation.

FIG. 10 shows yet another implementation of a feedback-type fluidic oscillator 1010 similar to the fluidic oscillators shown in FIGS. 2-9, but in this implementation the first control port 160 is defined by a wall 171 of the interaction chamber 170 disposed between the first end 182 of the first feedback channel 180 and the outlet nozzle 152 and the second control port 162 is defined by a wall 173 of the interaction chamber 170 disposed between the first end 192 of the second feedback channel 190 and the outlet nozzle 152. The flow directions 161, 163 of the first and second control ports 160, 162 are oriented toward the fluid supply inlet 150 and angled away from the central axis 178, such that the flow directions 161, 163 of the first and second control ports 160, 162 are both in a plane parallel to the interaction chamber plane 176.

Figure 11:
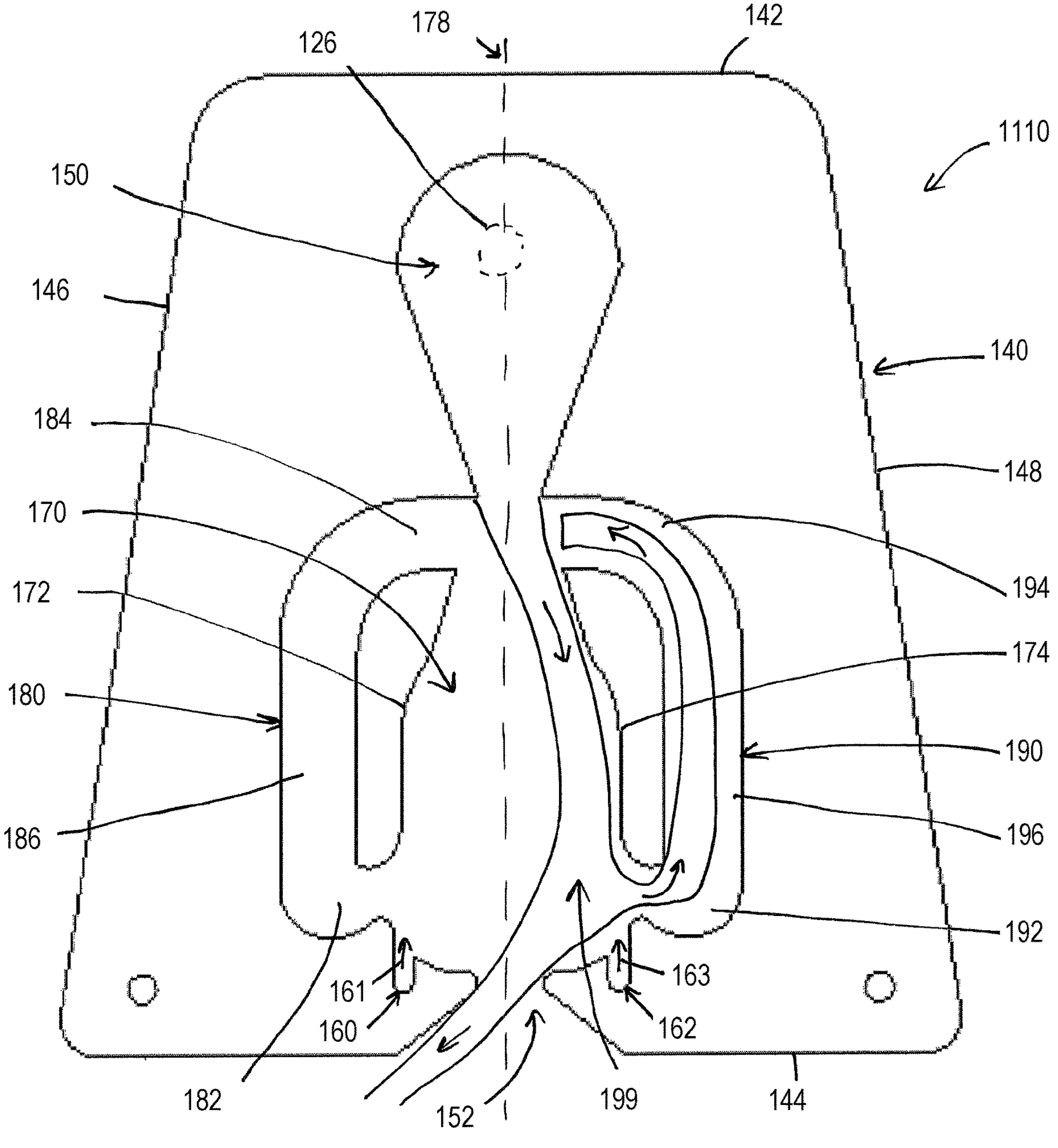
FIG. 11 is a top view of a feedback-type fluidic oscillator including two control ports, according to another implementation.
Figure 12A:
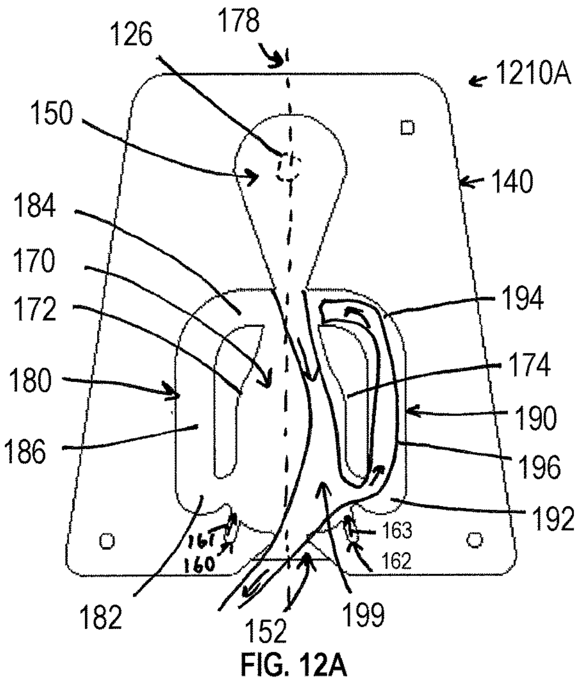
FIGS. 12A-D are top views of feedback-type fluidic oscillators including two control ports, according to other implementations.
Figure 12B:
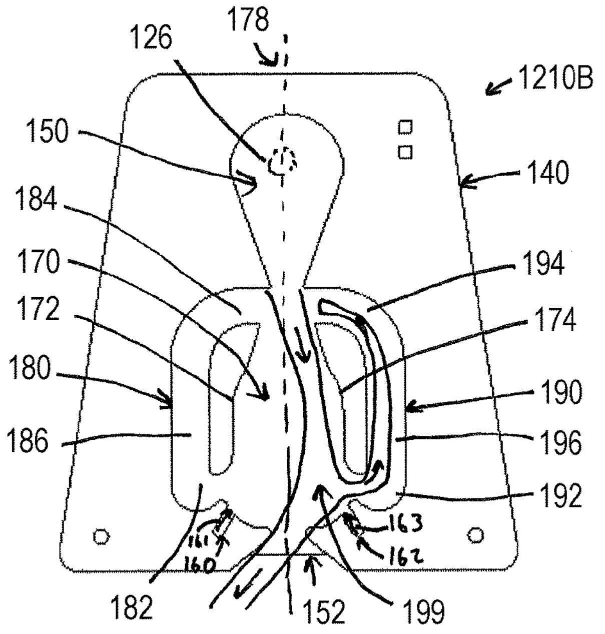
Figure 12C:
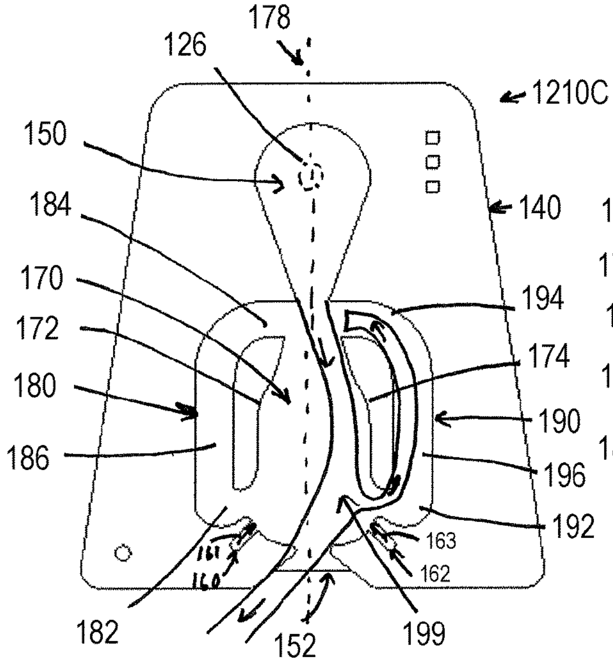
Figure 12D:
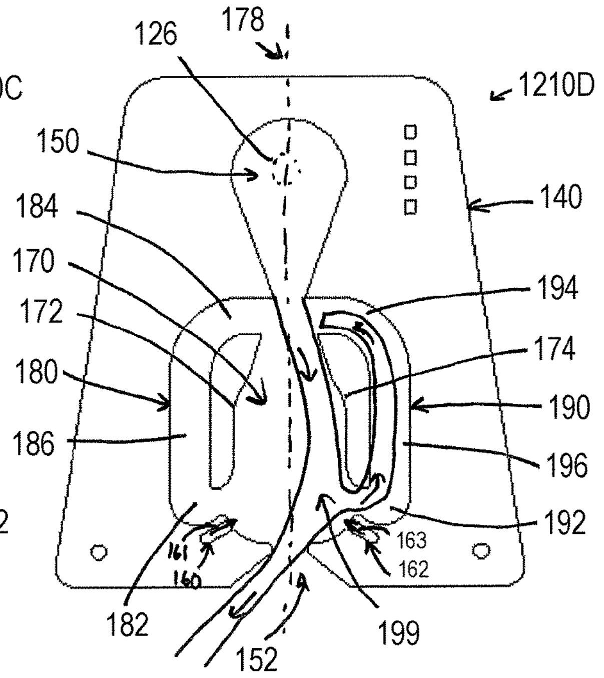
Figure 13A:
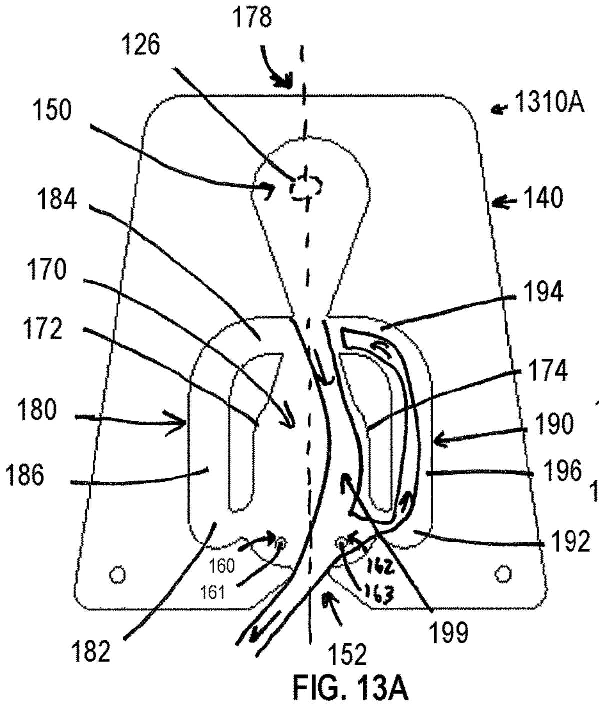
FIGS. 13A-D are top views of feedback-type fluidic oscillators including two control ports, according to other implementations.
Figure 13B:
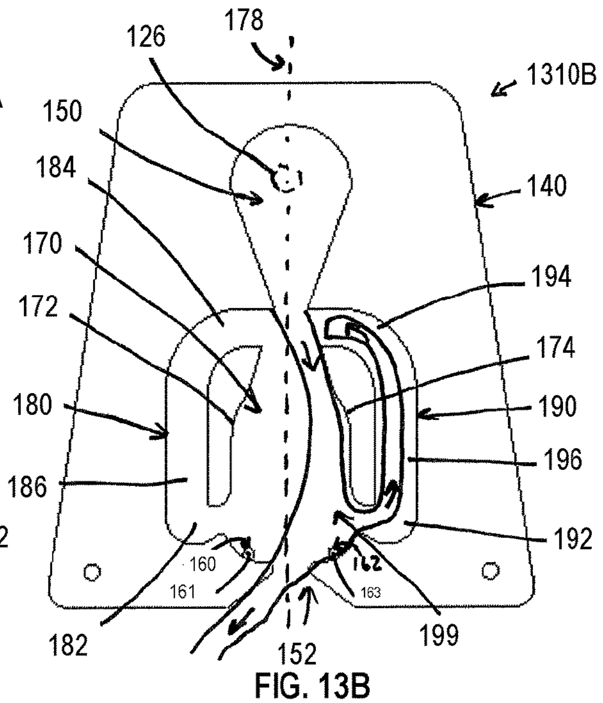
Figure 13C:
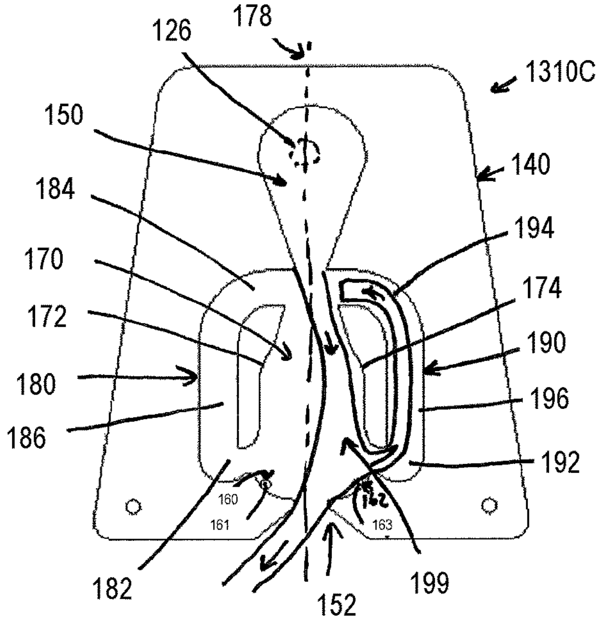
Figure 13D:
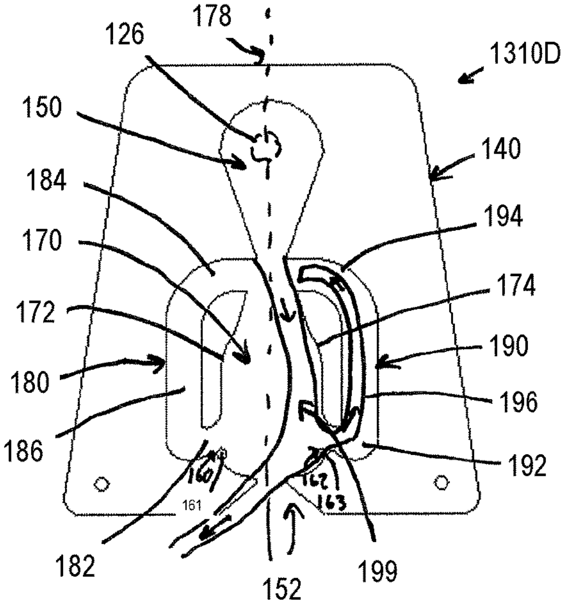

FIG. 11 shows another implementation of a feedback-type fluidic oscillator 1110 similar to the fluidic oscillator 1010 shown in FIG. 10 with the first control port 160 being defined by a wall 171 of the interaction chamber 170 disposed between the first end 182 of the first feedback channel 180 and the outlet nozzle 152 and the second control port 162 being defined by a wall 173 of the interaction chamber 170 disposed between the first end 192 of the second feedback channel 190 and the outlet nozzle 152. However, in the fluidic oscillator 1110 shown in FIG. 11, the flow directions 161, 163 of the first and second control ports 160, 162 are oriented toward the fluid supply inlet 150 and parallel to the central axis 178, such that the flow directions 161, 163 of the first and second control ports 160, 162 are both in a plane parallel to the interaction chamber plane 176.

FIGS. 12A-D show other implementations of feedback-type fluidic oscillators 1210A-D similar to the fluidic oscillator 1010 shown in FIG. 10 with the first control port 160 being defined by a wall 171 of the interaction chamber 170 disposed between the first end 182 of the first feedback channel 180 and the outlet nozzle 152 and the second control port 162 being defined by a wall 173 of the interaction chamber 170 disposed between the first end 192 of the second feedback channel 190 and the outlet nozzle 152. However, in the fluidic oscillators 1210A-D shown in FIGS. 12A-D, the flow directions 161, 163 of the first and second control ports 160, 162 are oriented toward the fluid supply inlet 150 and angled toward the central axis 178 at various angles, such that the flow directions 161, 163 of the first and second control ports 160, 162 are both in a plane parallel to the interaction chamber plane 176.

FIGS. 13A-D show other implementations of feedback-type fluidic oscillators 1310A-D similar to the fluidic oscillators shown in FIGS. 2-12. However, in the fluidic oscillators 1310A-D shown in FIGS. 13A-D, the first and second control ports 160, 162 are defined by the first portion 120 and are in direct fluid communication with the interaction chamber 170, such that the control fluid introduced from the first and second control ports 160, 162 (or fluid stream suctioned from the first and second control ports 160, 162) is introduced directly into (or suctioned directly from) the interaction chamber 170. The flow directions 161, 163 of the first and second control ports 160, 162 are oriented toward the second portion 130 of the fluidic oscillator 1310A-D, such that the flow directions 161, 163 of the first and second control ports 160, 162 are both perpendicular to the interaction chamber plane 176.

Figure 14:
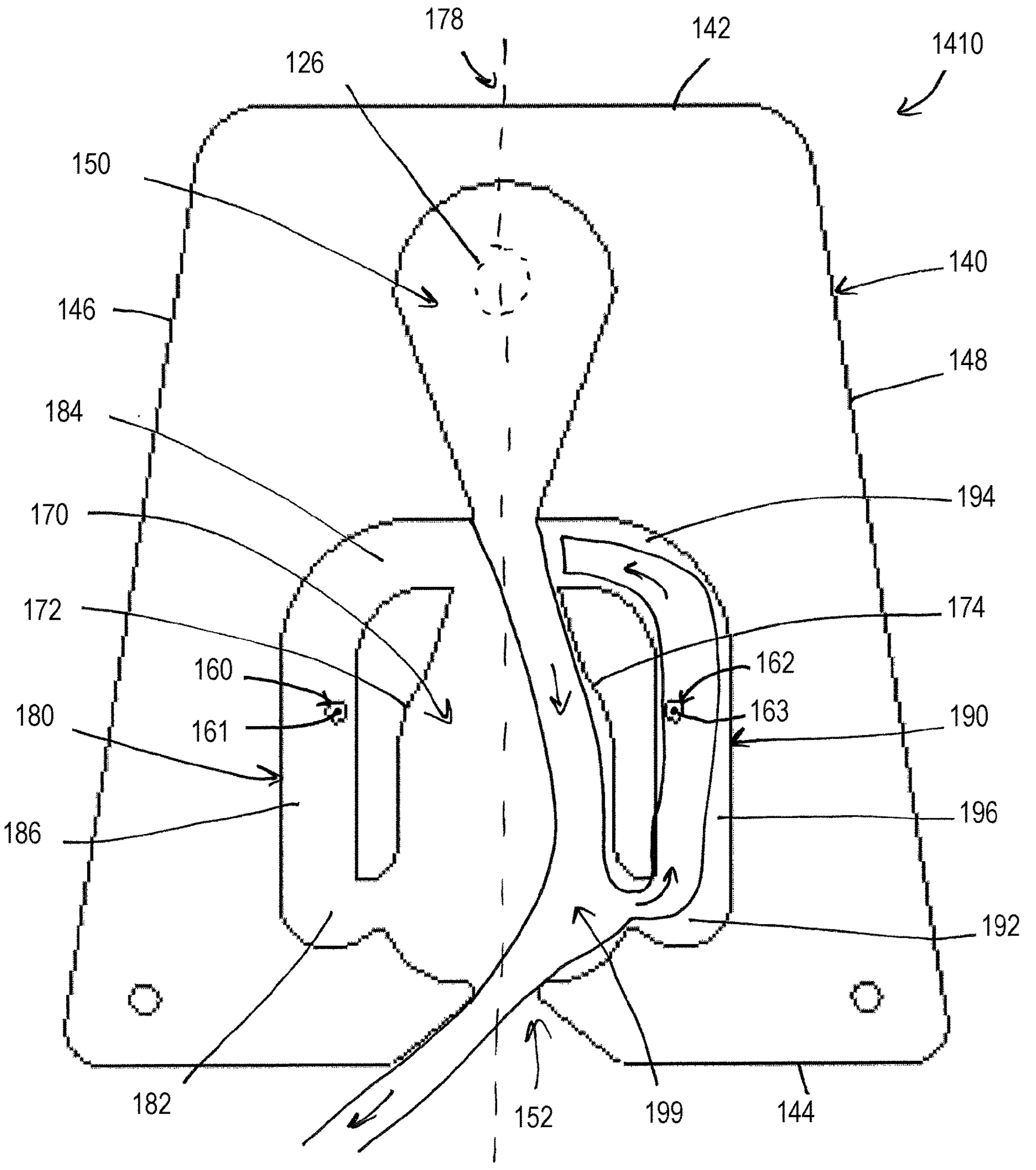
FIG. 14 is a top view of a feedback-type fluidic oscillator including two control ports, according to another implementation.

FIG. 14 shows another implementation of a feedback-type fluidic oscillator 1410 similar to the fluidic oscillators 1310A-D shown in FIGS. 13A-D with the first and second control ports 160, 162 being defined by the first portion 120 of the fluidic oscillator 1410 and the flow directions 161, 163 of the first and second control ports 160, 162 being oriented toward the second portion 130 of the fluidic oscillator 1410, such that the flow directions 161, 163 of the first and second control ports 160, 162 are both perpendicular to the interaction chamber plane 176. However, in the fluidic oscillator 1410 shown in FIG. 14, the first and second control ports 160, 162 are in direct fluid communication with the first and second feedback chambers 180, 190, respectively, such that the control fluid introduced from the first and second control ports 160, 162 (or fluid stream suctioned from the first and second control ports 160, 162) is introduced directly into (or suctioned directly from) the first and second feedback chambers 180, 190, respectively.

Figure 15A:
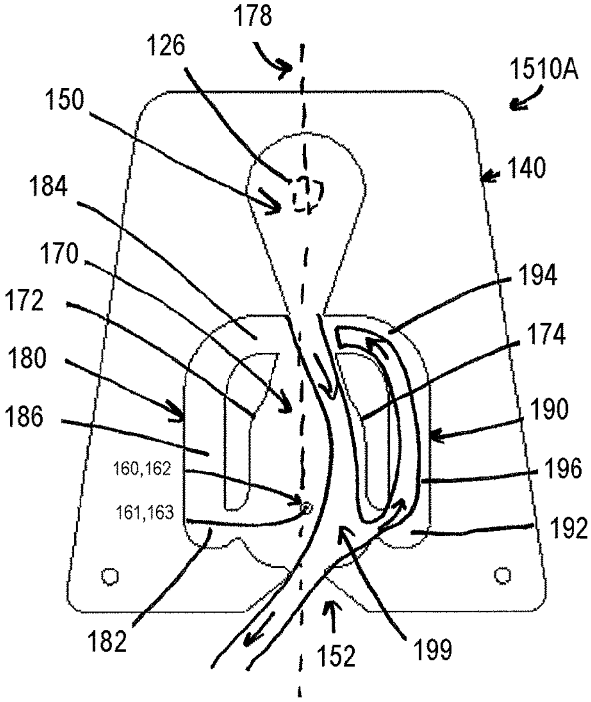
FIGS. 15A-C are top views of feedback-type fluidic oscillators including two control ports, according to other implementations.
Figure 15B:
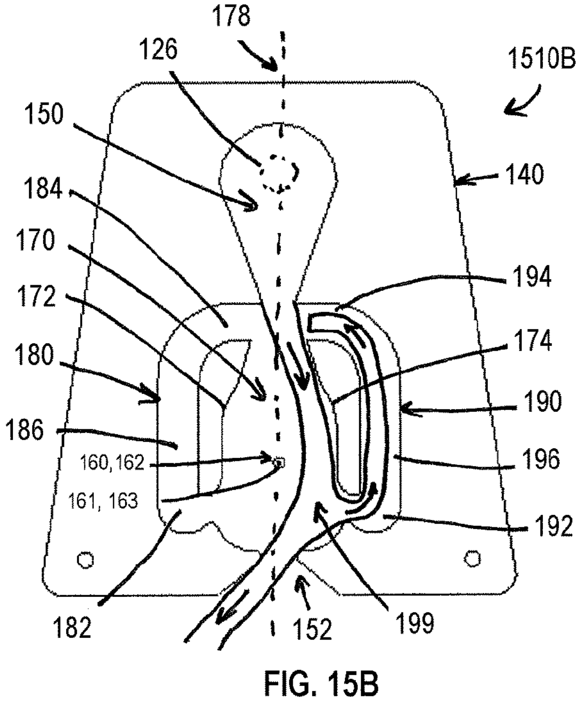
Figure 15C:
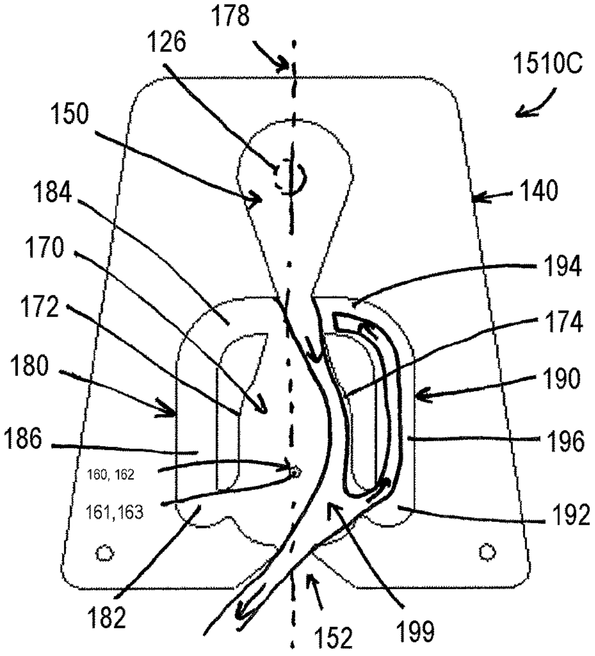

FIGS. 15A-C show other implementations of feedback-type fluidic oscillators 1510A-C similar to the fluidic oscillators 1310A-D shown in FIGS. 13A-D with the first and second control ports 160, 162 being in direct fluid communication with the interaction chamber 170, such that the control fluid introduced from the first and second control ports 160, 162 (or fluid stream suctioned from the first and second control ports 160, 162) is introduced directly into (or suctioned directly from) the interaction chamber 170. However, in the fluidic oscillators 1510A-C shown in FIGS. 15A-C, the first control port 160 is defined by the first portion 120 and the second control port 162 is defined by the second portion 130. The flow direction 161 of the first control port 160 is coincident with, and opposite, the flow direction 163 of the second control port 162.

Figure 16A:
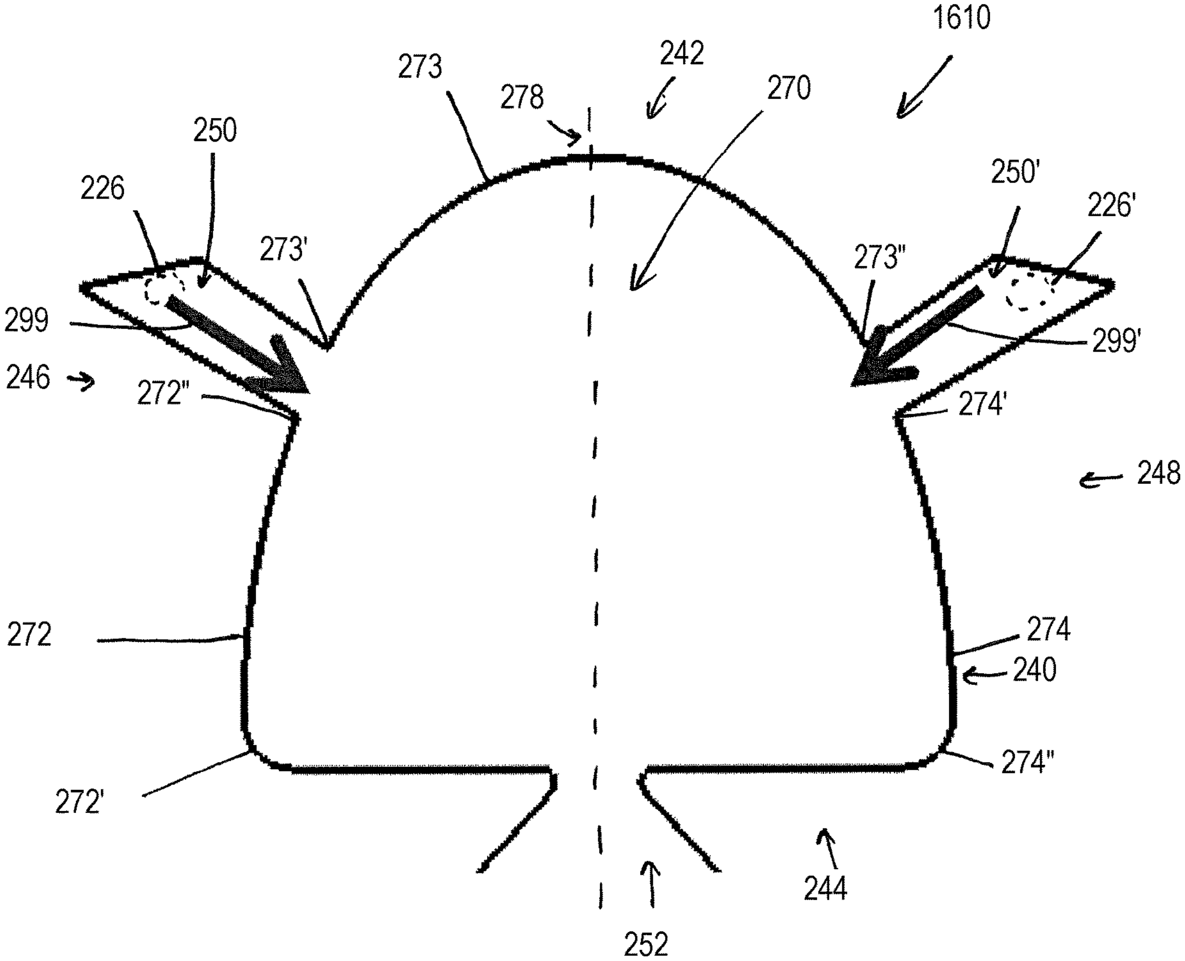
FIG. 16A (PRIOR ART)
FIG. 16A is a top view of a jet interaction-type fluidic oscillator of the prior art.
Figure 16B:
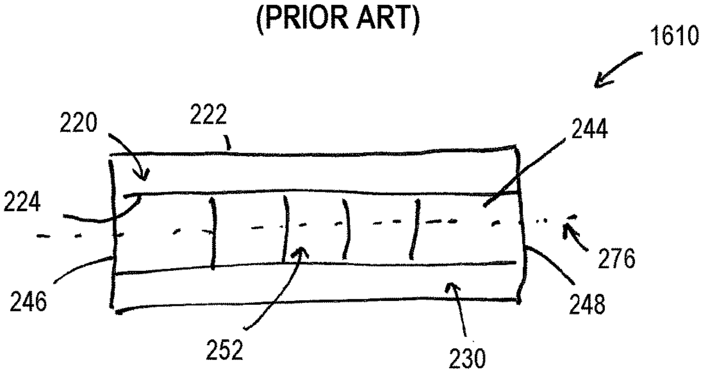
FIG. 16B (PRIOR ART)
FIG. 16B is an end view of the jet interaction-type fluidic oscillator of FIG. 16A.

FIG. 16A shows a top view of a jet interaction-type fluidic oscillator 1610, and FIG. 16B shows an end view of the jet interaction-type fluidic oscillator 1610 as viewed from the second end 244 of the middle portion 240. The jet interaction-type fluidic oscillator 1610 differs from the feedback-type fluidic oscillator 110 of FIG. 1 in that the jet interaction-type fluidic oscillator 1610 utilizes multiple fluid supply inputs 250, 250' to vary the oscillation frequency of the fluid stream 299 exiting the output nozzle 252. Similar to the feedback-type fluidic oscillator 110 of FIG. 1, the jet interaction-type fluidic oscillator 1610 includes a first portion 220, a second portion 230, and a middle portion 240 disposed between the first portion 220 and the second portion 230. The middle portion 240 has a first end 242 and a second end 244 opposite and spaced apart from the first end 242, and a first side 246 and a second side 248 opposite and spaced apart from the first side 246. The middle portion 240 is structured such that, when the middle portion 240 is disposed between the first portion 220 and the second portion 230, openings are defined by the walls of the middle portion 240. The openings in the middle portion 240 of the fluidic oscillator 1610 include an interaction chamber 270, a first fluid supply inlet 250, a second fluid supply inlet 250', and an outlet nozzle 252. The middle portion 240 of the fluidic oscillator 1610 also includes a central axis 278 extending between the middle wall 273 and the outlet nozzle 252.

Similar to the feedback-type fluidic oscillator 110 of FIG. 1, the first portion 220 of the jet interaction-type fluidic oscillator 1610 has a first side 222 and a second side 224 opposite and spaced apart from the first side 222, and the first portion 220 defines a first inlet port 226 and a second inlet port 226' extending from the first side 222 of the first portion 220 to the second side 224 of the first portion 220. The first fluid supply inlet 250 of the middle portion 240 is located adjacent the first end 242 of the middle portion 240, and the first inlet port 226 is aligned with the first fluid supply inlet 250 such that the first inlet port 226 and the first fluid supply inlet 250 are in fluid communication with each other. The second fluid supply inlet 250' of the middle portion 240 is also located adjacent the first end 242 of the middle portion 240, and the second inlet port 226' is aligned with the second fluid supply inlet 250' such that the second inlet port 226' and the second fluid supply inlet 250' are in fluid communication with each other.

The outlet nozzle 252 is located adjacent the second end 244 of the middle portion 240, downstream of the fluid supply inlet 250, as discussed below. The outlet nozzle 252 extends from the second end 244 of the middle portion 240 toward the first end 242 of the middle portion 240.

The interaction chamber 270 is located between, and is in fluid communication with, the first fluid supply inlet 250, the second fluid supply inlet 250', and the outlet nozzle 252. The interaction chamber 270 has a first wall 272, a second wall 274, and a middle wall 273. Each of the first wall 272, second wall 274, and middle wall 273 have a first edge 272', 274', 273' and a second edge 272", 274", 273". The interaction chamber 270 also has an interaction chamber plane 276 extending between the first wall 272 and the second wall 274 and parallel to the first side 222 of the first portion 220. The first fluid supply inlet 250 is disposed between the second edge 272" of the first wall 272 and the first edge 273' of the middle wall 273, and the second fluid supply inlet 250' is disposed between the second edge 273" of the middle wall 273 and the first edge 274' of the second wall 274. The first wall 272 and second wall 274 mirror each other across a plane intersecting the central axis 278 and perpendicular to the interaction chamber plane 276.

A first fluid stream 299 enters the fluidic oscillator 1610 through the first inlet port 226 and flows through the first fluid supply inlet 250, through the interaction chamber 270, and exits the fluidic oscillator 1610 through the outlet nozzle 252. Because of the angle of the first fluid supply inlet 250, the first fluid stream 299 enters the interaction chamber and exits the outlet nozzle 252 at an angle. The fluidic oscillator 1610 then alternates the fluid flow from the first inlet port 226 to the second inlet port 226'. As a second fluid stream 299' enters the fluidic oscillator 1610 through the second inlet port 226', the second fluid stream 299' flows through the second fluid supply inlet 250', through the interaction chamber 270, and exits the fluidic oscillator 1610 through the outlet nozzle 252. Because the second fluid supply inlet 250' is oriented at an opposite angle with respect to the central axis 278 than the first fluid supply inlet 250, the second fluid stream 299' enters the interaction chamber and exits the outlet nozzle 252 at an opposite angle from the first fluid stream 299 of the first inlet port 226. Alternating between providing a fluid stream 299, 299' to the first inlet port 226 and the second inlet port 226' causes an oscillation of the fluid stream 299, 299' exiting the outlet nozzle 252. As discussed above with respect to the feedback-type oscillator 110, the first and second fluid streams 299, 299' can include any fluid, for example, any liquid or gas.

Figure 17:
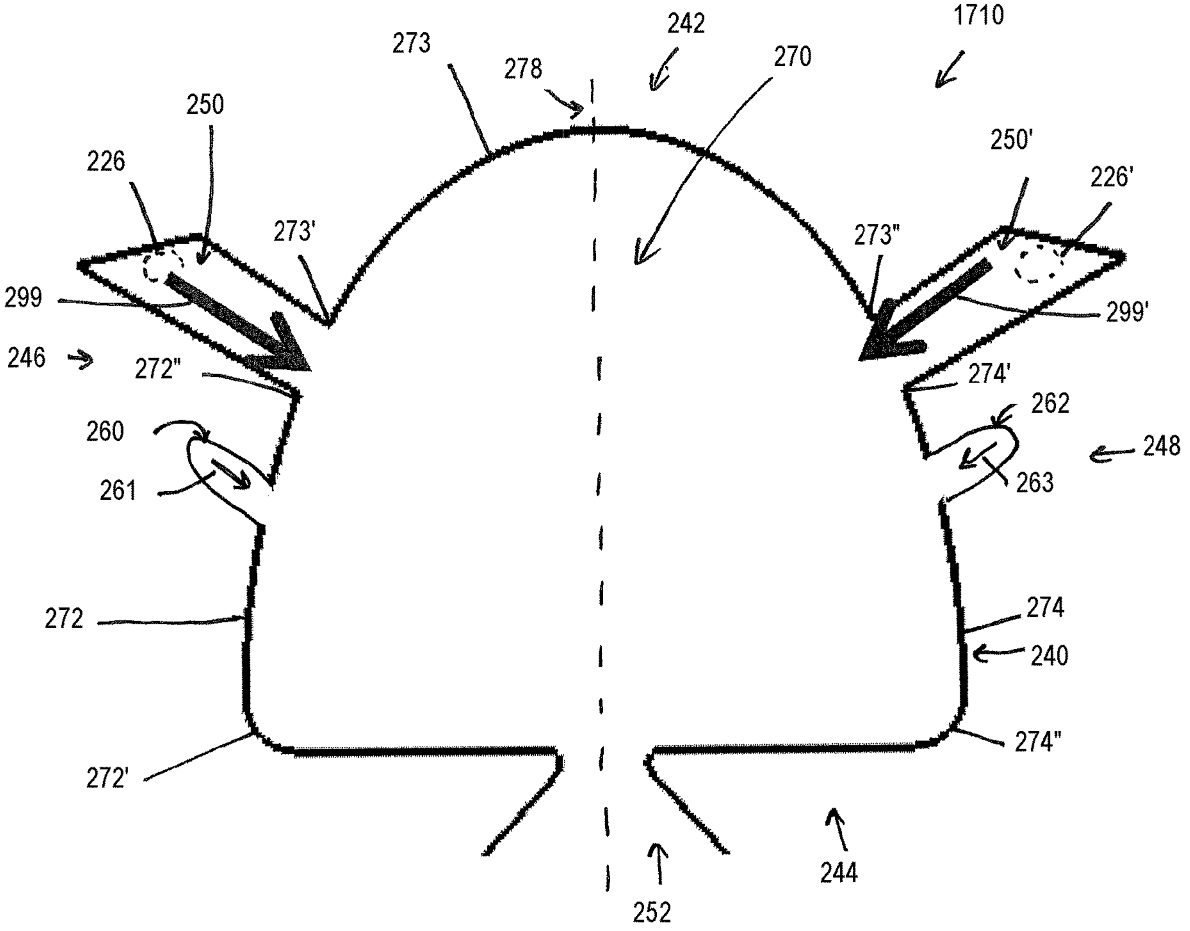
FIG. 17 is a top view of a jet interaction-type fluidic oscillator including two control ports, according to one implementation.

FIG. 17 shows one example of a jet interaction-type fluidic oscillator 1710 according to an implementation of the current application. The fluidic oscillator 1710 of FIG. 17 is similar to the fluidic oscillator 1610 shown in FIG. 16, but the fluidic oscillator 1710 includes a first control port 260 and a second control port 262. The first control port 260 has a flow direction 261 and the second control port 262 has a flow direction 263 in which the first control port 260 and the second control port 262 introduce a control fluid into the fluidic oscillator 1710. However, in other implementations, the first and second control ports still have a flow direction but create a suction in the fluidic oscillator rather than introduce a control fluid. The suction from the first and second fluidic oscillators removes a portion of the fluid stream from the fluidic oscillator in the flow direction. In all implementations discussed herein, the introduction of control fluid from (or the suction from) the control ports 260, 262 can be continuous, time varied (e.g., periodic), or port varied (e.g., one control port can be continuous with the other control port being periodic, or one control port being introducing a control fluid with the other control port suctioning).

As discussed above with respect to the feedback-type fluidic oscillators, as control fluid is introduced into (or a portion of the fluid stream is suctioned from) the jet interaction-type fluidic oscillator, the frequency and sweeping angle of the fluid stream exiting the fluidic oscillator is varied. Thus, the frequency and sweeping angle of the exiting fluid stream can be varied for a given flow rate and for a given fluidic oscillator while no moving parts are added to the system. A single fluidic oscillator design can, therefore, provide the same outputs as many different fluidic oscillator designs.

In the implementations described herein, circular ports are used for control ports defined by upper and lower surfaces and rectangular ports are used for control ports defined by side surfaces. However, the port shape shown is arbitrary based on desired effect, and in other implementations, the control port shape may be circular, rectangular, square, oval, triangular, rhombus, trapezoid, pentagon, hexagon, or any other shape capable of introducing a fluid into, or suctioning fluid from the fluidic oscillator.

In the fluidic oscillator 1710 of FIG. 17, the first control port 260 is defined by the first wall 272, and the second control port 262 is defined by the second wall 274. The flow directions 261, 263 of the first and second control ports 260, 262 are oriented toward the outlet nozzle 252 and angled toward the central axis 278, such that the flow directions 261, 263 of the first and second control ports 260, 262 are both in a plane parallel to the interaction chamber plane 276.

Figure 18:
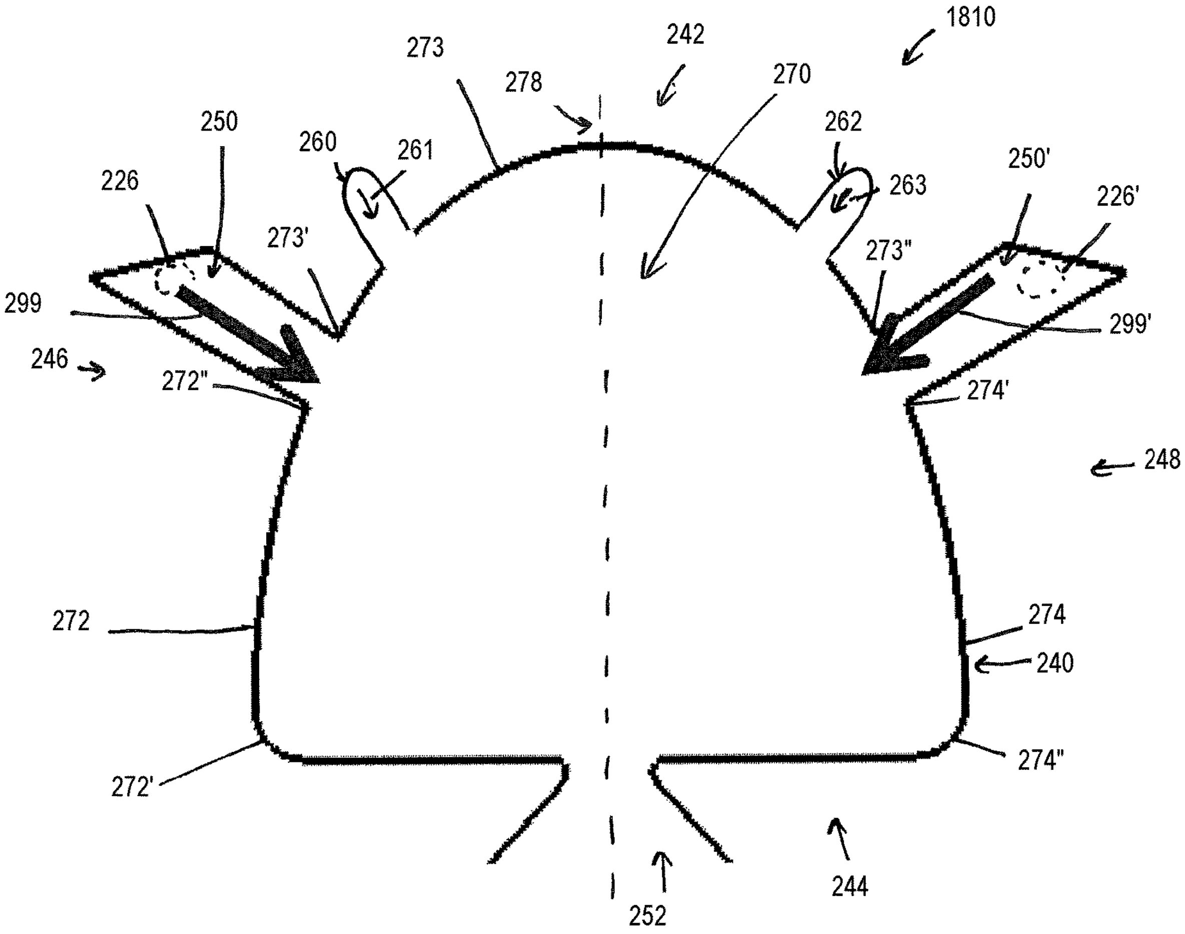
FIG. 18 is a top view of a jet interaction-type fluidic oscillator including two control ports, according to another implementation.

FIG. 18 shows another implementation of a jet interaction-type fluidic oscillator 1810 similar to the fluidic oscillator 1710 shown in FIG. 17 with the flow directions 261, 263 of the first and second control ports 260, 262 being oriented toward the outlet nozzle 252 and angled toward the central axis 278, such that the flow directions 261, 263 of the first and second control ports 260, 262 are both in a plane parallel to the interaction chamber plane 276. However, in the fluidic oscillator 1810 shown in FIG. 18, the first and second control ports 260, 262 are defined by the middle wall 273.

Figure 19:
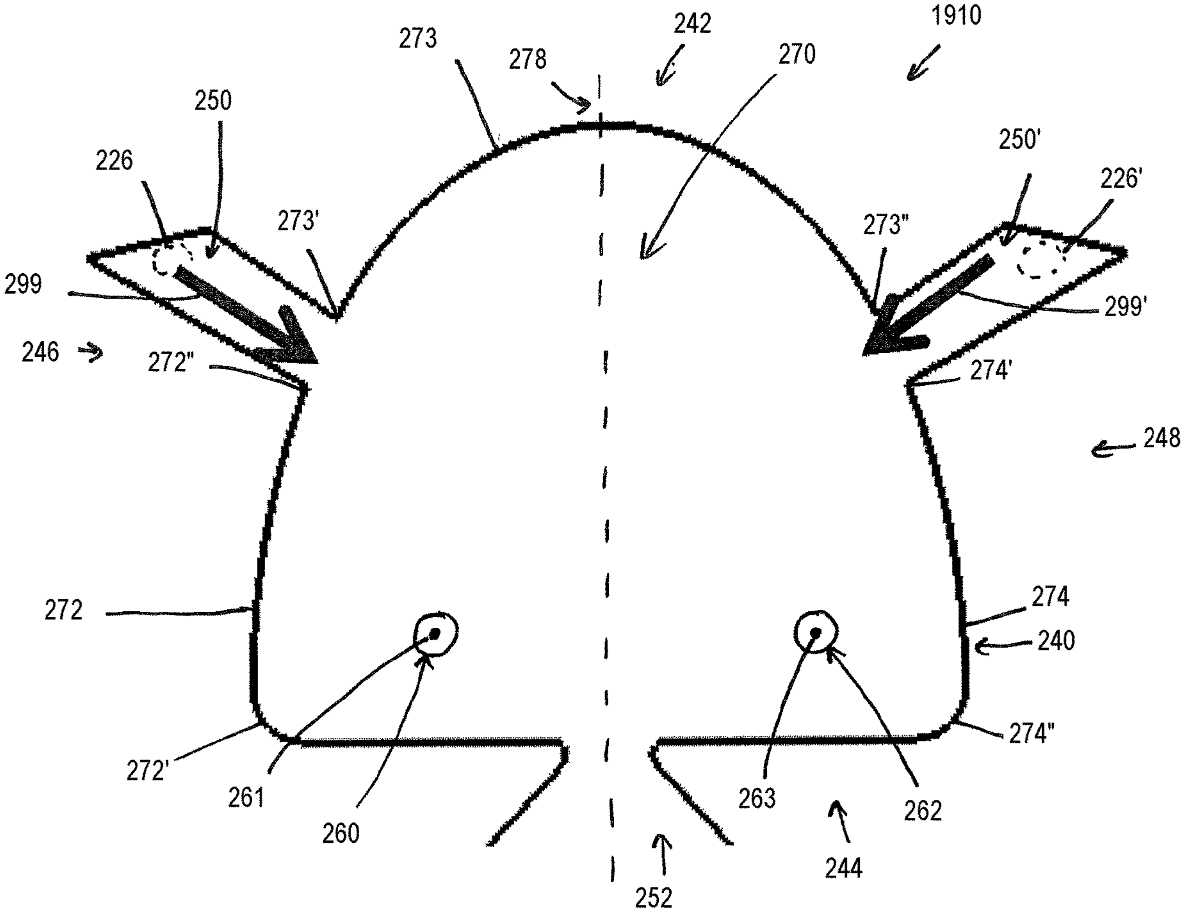
FIG. 19 is a top view of a jet interaction-type fluidic oscillator including two control ports, according to another implementation.

FIG. 19 shows another implementation of a jet interaction-type fluidic oscillator 1910 similar to the fluidic oscillator 1710 shown in FIG. 17. However, in the fluidic oscillator 1910 shown in FIG. 19, the first and second control ports 260, 262 are defined by the first portion 220 and are in direct fluid communication with the interaction chamber 270, such that the control fluid introduced from the first and second control ports 260, 262 (or fluid stream suctioned from the first and second control ports 260, 262) is introduced directly into (or suctioned directly from) the interaction chamber 270. The flow directions 261, 263 of the first and second control ports 260, 262 are oriented toward the second portion 230 of the fluidic oscillator 1910, such that the flow directions 261, 263 of the first and second control ports 260, 262 are both perpendicular to the interaction chamber plane 276.

Figure 20:
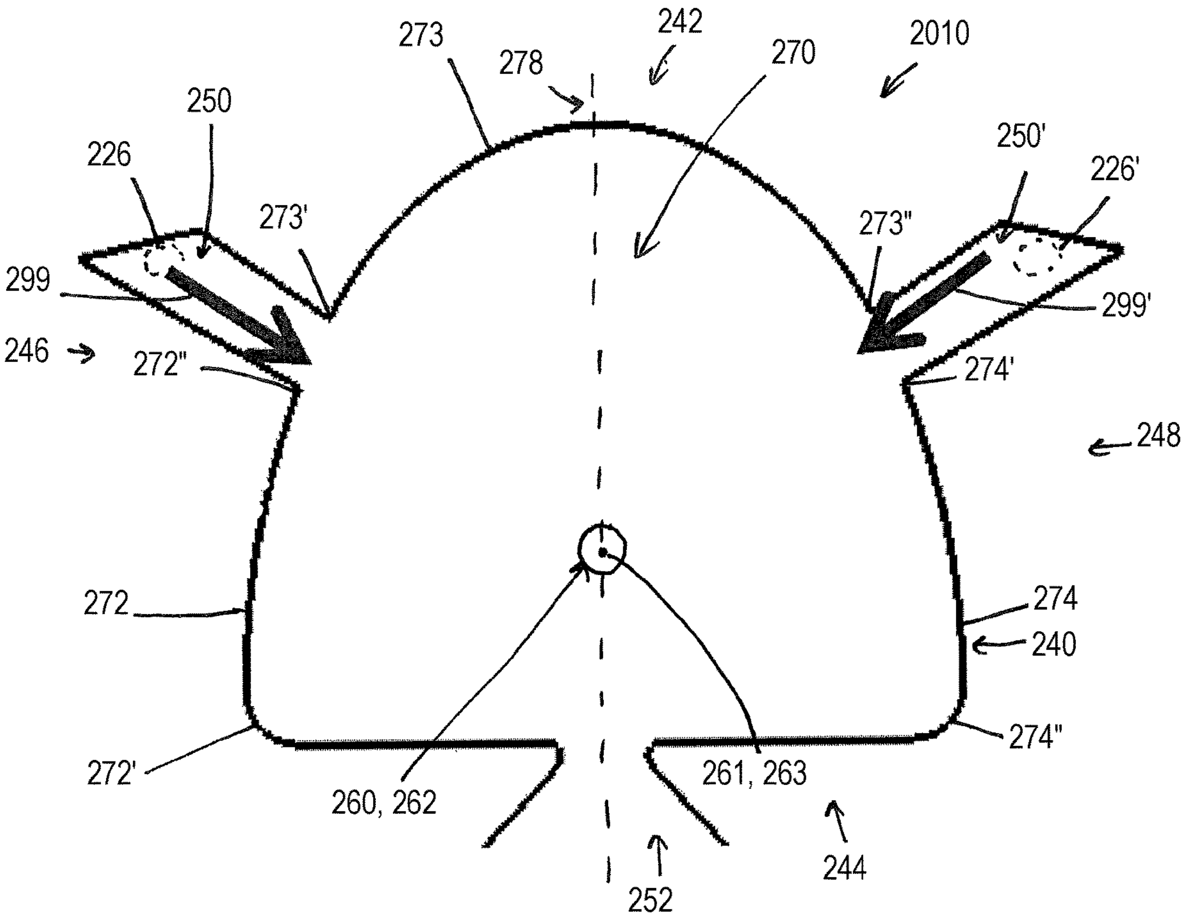
FIG. 20 is a top view of a jet interaction-type fluidic oscillator including two control ports, according to another implementation.

FIG. 20 shows another implementation of a feedback-type fluidic oscillator 2010 similar to the fluidic oscillator 1710 shown in FIG. 17 with the first and second control ports 260, 262 being in direct fluid communication with the interaction chamber 270, such that the control fluid introduced from the first and second control ports 260, 262 (or fluid stream suctioned from the first and second control ports 260, 262) is introduced directly into (or suctioned directly from) the interaction chamber 270. However, in the fluidic oscillator 2010 shown in FIG. 20, the first control port 260 is defined by the first portion 220 and the second control port 262 is defined by the second portion 230. The flow direction 261 of the first control port 260 is coincident with, and opposite, the flow direction 263 of the second control port 262.

FIGS. 2-15 and 17-20 show implementations of fluidic oscillators including control ports disposed within the interaction chambers or feedback channels of the fluidic oscillators to alter the frequency and sweeping angle of the fluid stream exiting the outlet nozzle in a plane parallel to the first side of the middle portion. However, in some implementations, a fluidic oscillator includes control ports defined by the outlet nozzle. In these implementations, the control ports can be used not only to alter the frequency and sweeping angle of the exiting fluid stream in the plane parallel to the interaction chamber plane, but can also be used to angle the exiting fluid stream in a direction transverse to the plane parallel to the interaction chamber plane. Because the control ports are located at, or just upstream from, the outlet nozzle of the fluidic oscillator, the application of the control ports in these implementations is generic to the fluidic oscillator type (e.g., feedback-type or jet interaction-type).

Figure 21:
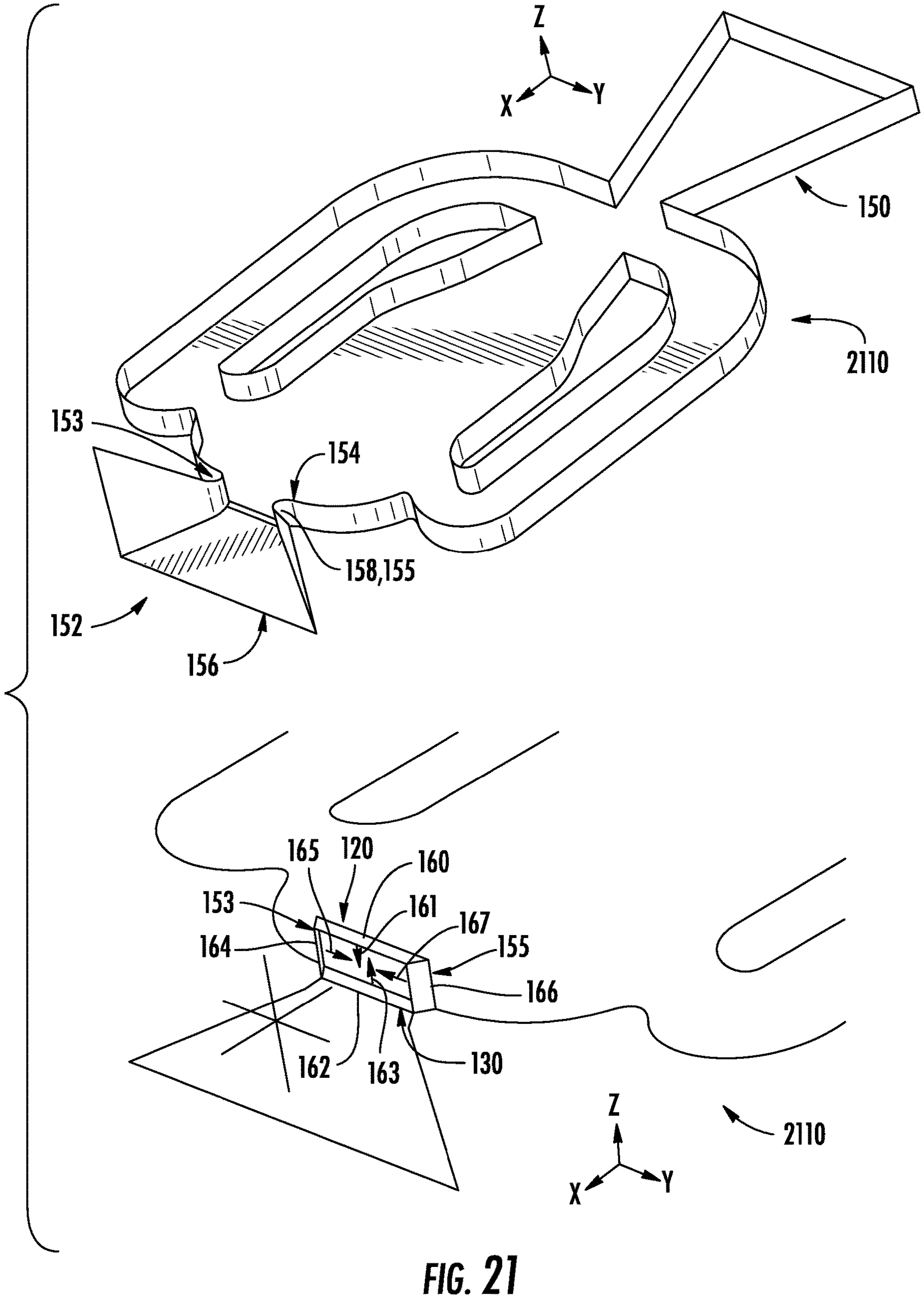
FIG. 21 is a perspective, cutaway view of a feedback-type fluidic oscillator including four control ports defined by the outlet nozzle and a schematic view of the four control ports.

FIG. 21 shows one example of a fluidic oscillator 2110 according to an implementation of the current application. The fluidic oscillator 2110 is a feedback-type fluidic oscillator similar to the feedback-type fluidic oscillators shown in FIGS. 1-15, but in other implementations, the fluidic oscillator could be any other type of fluidic oscillator, such as a jet interaction-type fluidic oscillator similar to the fluidic oscillators shown in FIGS. 16-20. The outlet nozzle 152 has a first end 154, a second end 156, and a narrowest portion 158 disposed between the first end 154 of the outlet nozzle 152 and the second end 156 of the outlet nozzle 152. The first end 154 of the outlet nozzle 152 is closer than the second end 156 of the outlet nozzle 152 to the fluid supply inlet 150. The narrowest portion 158 of the outlet nozzle 152 has a smallest inner area in a plane parallel to the second end 144 of the middle portion 140.

In the fluidic oscillator 2110 of FIG. 21, the first control port 160 and the second control port 162 each have a flow direction 161, 163. The first control port 160 and the second control port 162 are for either introducing a control fluid into the fluidic oscillator 2110 in the flow direction 161, 163 or suctioning the fluid stream from the fluidic oscillator 2110 in the flow direction 161, 163, similar to the control ports 160, 162, 260, 262 described above with respect to the fluidic oscillators shown in FIGS. 2-15 and 17-20. The first control port 160 is defined by the first portion 120 and the second control port 162 is defined by the second portion 130. However, in the implementation shown in FIG. 21, the first control port 160 and the second control port 162 are defined by, and in fluid communication with, the outlet nozzle 152.

The fluidic oscillator 2110 of FIG. 21 also includes a third control port 164 and fourth control port 166 defined by the outlet nozzle 152. The third control port 164 is defined by a first outlet nozzle side wall 153 and the fourth control port 166 is defined by a second outlet nozzle side wall 155 opposite and spaced apart from the first outlet nozzle side wall 153.

Figure 22:
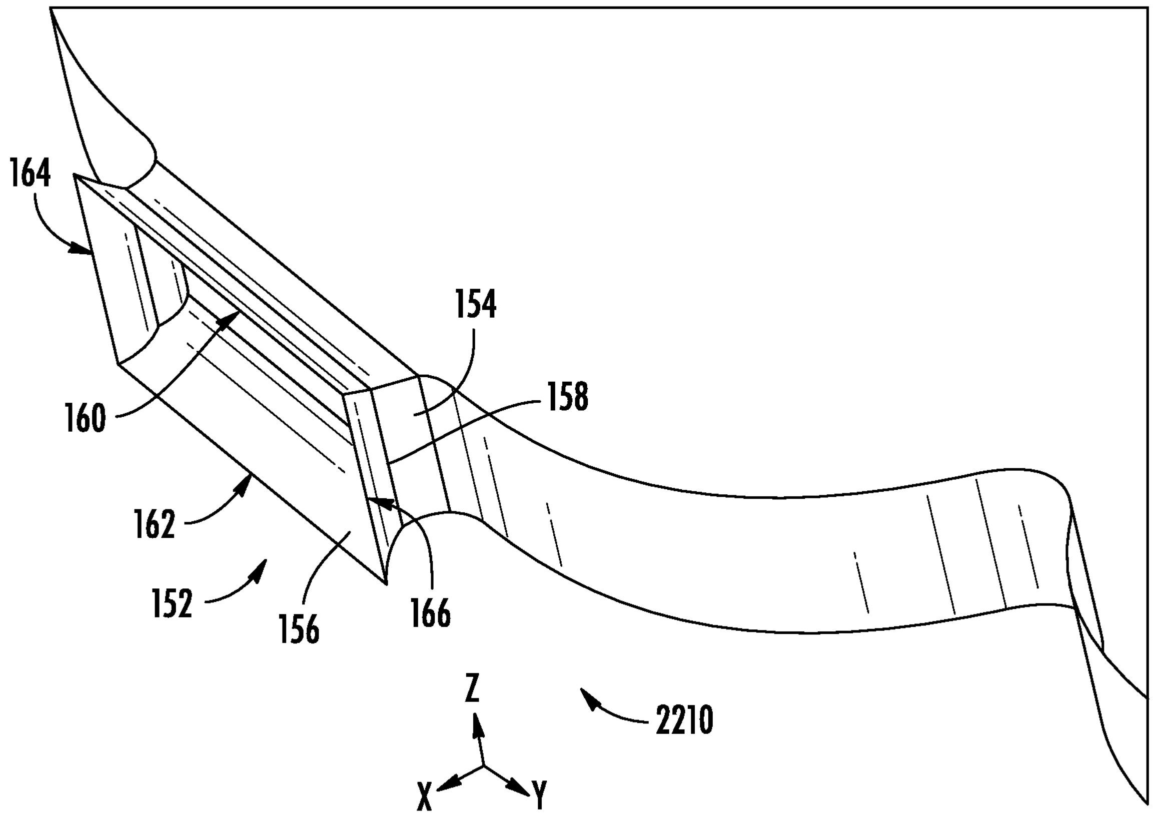
FIG. 22 is a perspective view of a feedback-type fluidic oscillator including four control ports defined by the outlet nozzle, according to another implementation.

Each of the first, second, third, and fourth control ports 160, 162, 164, 166 are disposed between the first end 154 of the outlet nozzle 152 and the narrowest portion 158 of the outlet nozzle 152. FIG. 22 shows another implementation of a fluidic oscillator 2210 similar to the fluidic oscillator 2110 shown in FIG. 21, but in the implementation shown in FIG. 22, each of the first, second, third, and fourth control ports 160, 162, 164, 166 are disposed between the second end 156 of the outlet nozzle 152 and the narrowest portion 158 of the outlet nozzle 152.

Introduction of a control fluid (or creation of suction) from the third and fourth control ports 164, 166 can be used to alter the frequency and sweeping angle of the fluid stream 199 exiting the outlet nozzle 152 similar to the implementations described above and shown in FIGS. 2-15 and 17-20.

The introduction of a control fluid (or creation of suction) from the first or second control ports 160, 162 causes interference with the fluid stream 199 as it exits the outlet nozzle 152. While the fluid stream 199 exiting the outlet nozzle 152 normally oscillates in a plane parallel to the interaction chamber plane 176 of the fluidic oscillator 2110, the interference from the control fluid introduced (or creation of suction) from the first and second control ports 160, 162 causes the fluid stream 199 to deflect (or, with the use of suction, be drawn) at an angle such that the fluid stream 199 exits the outlet nozzle 152 in a direction transverse to the plane parallel to the interaction chamber plane 176. By alternating the introduction of a control fluid (or creation of suction) from the first and second control ports 160, 162, the fluid stream 199 oscillates in a plane perpendicular to the interaction chamber plane 176. Thus, the fluid stream 199 oscillates in two axes as it exits the outlet nozzle 152 in a third axis, creating a 3D oscillation pattern.

Figure 23:
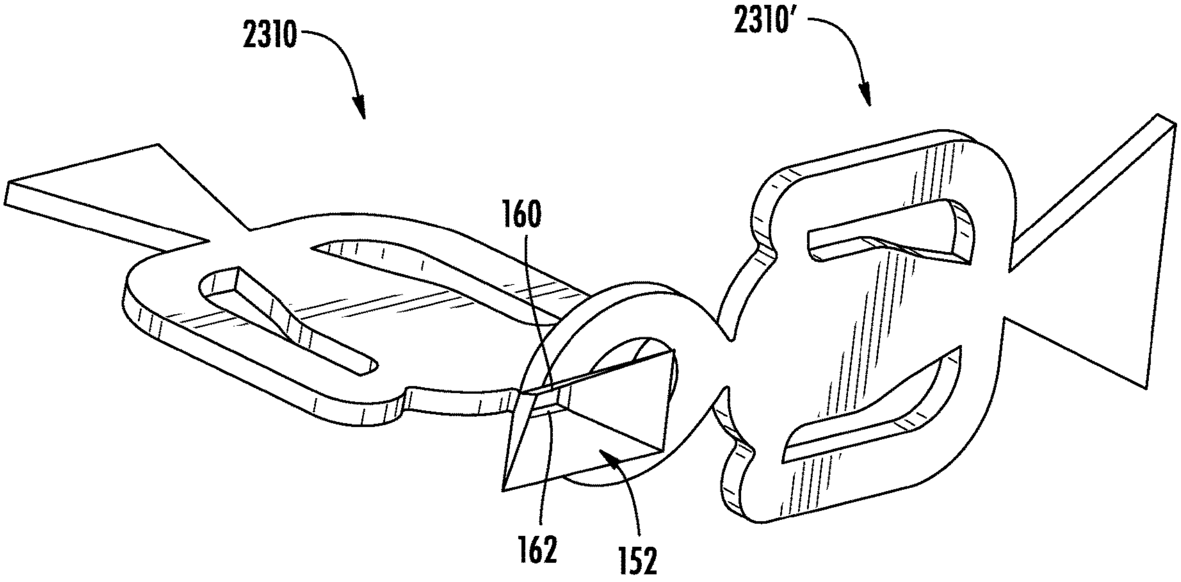
FIG. 23 is a perspective view of a first feedback-type fluidic oscillator including four control ports defined by the outlet nozzle and a second feedback-type fluidic oscillator controlling two of the control ports of the first feedback-type fluidic oscillator, according to another implementation.

FIG. 23 shows an implementation of a fluidic oscillator 2310 similar to the fluidic oscillator 2110 shown in FIG. 21, but in the implementation shown in FIG. 23, the control fluid introduced through the first control port 160 and the second control port 162 are provided by a second fluidic oscillator 2310'. Although the second fluidic oscillator 2310' is shown to the side of the fluidic oscillator 2310, in other implementations, the second fluidic oscillator can be above the fluidic oscillator 2310, below the fluidic oscillator 2310, behind the fluidic oscillator 2310, in front of the fluidic oscillator 2310, or in any orientation with respect to the fluidic oscillator 2310 wherein the fluid stream exiting the second fluidic oscillator 2310' can flow into the control ports 160, 162 of the fluidic oscillator 2310. Thus, the first control port 160 and second control port 162 are controlled by the second fluidic oscillator 2310' such that the second fluidic oscillator 2310' alternates the introduction of a control fluid to the first control port 160 and to the second control port 162. Although a second fluidic oscillator 2310' is used to control the first and second control ports 160, 162 in the fluidic oscillator 2310 shown in FIG. 23, in other implementations, the control ports of the fluidic oscillator are controlled using solenoid valves, synthetic jets, or any other time-varying (pulsated) flow or suction generating devices.

Figure 24:
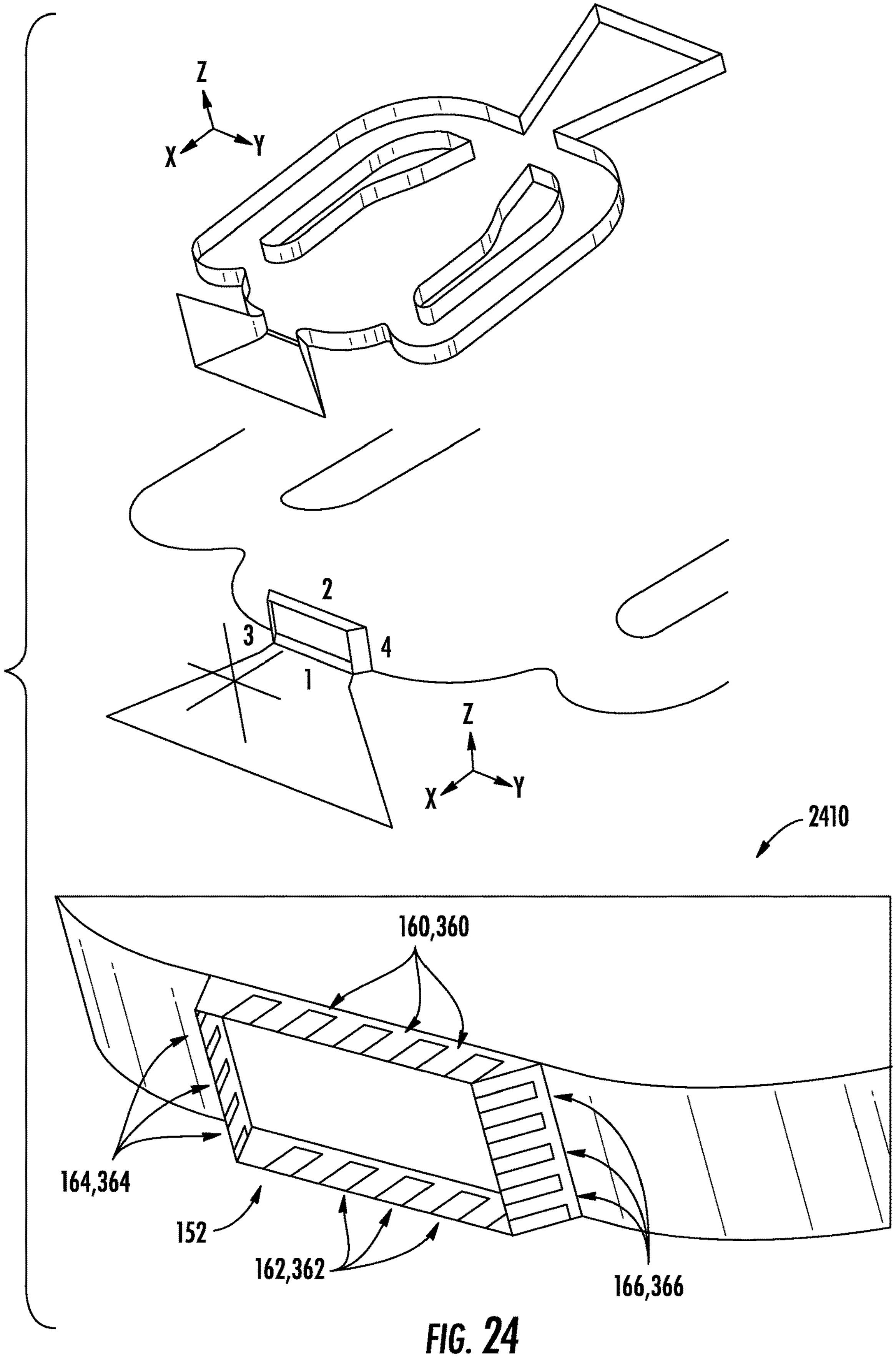
FIG. 24 is a perspective, cutaway view of a feedback-type fluidic oscillator including four pluralities of control ports defined by the outlet nozzle and schematic views of the four pluralities of control ports.

FIG. 24 shows another implementation of a fluidic oscillator 2410 similar to the fluidic oscillator 2110 shown in FIG. 21. However, in the fluidic oscillator 2410 shown in FIG. 24, the first control port 160 includes a first plurality of control ports 360 and the second control port 162 includes a second plurality of control ports 362. Similarly, the third control port 164 includes a third plurality of control ports

364 and the fourth control port 166 includes a fourth plurality of control ports 366.

Figure 25:
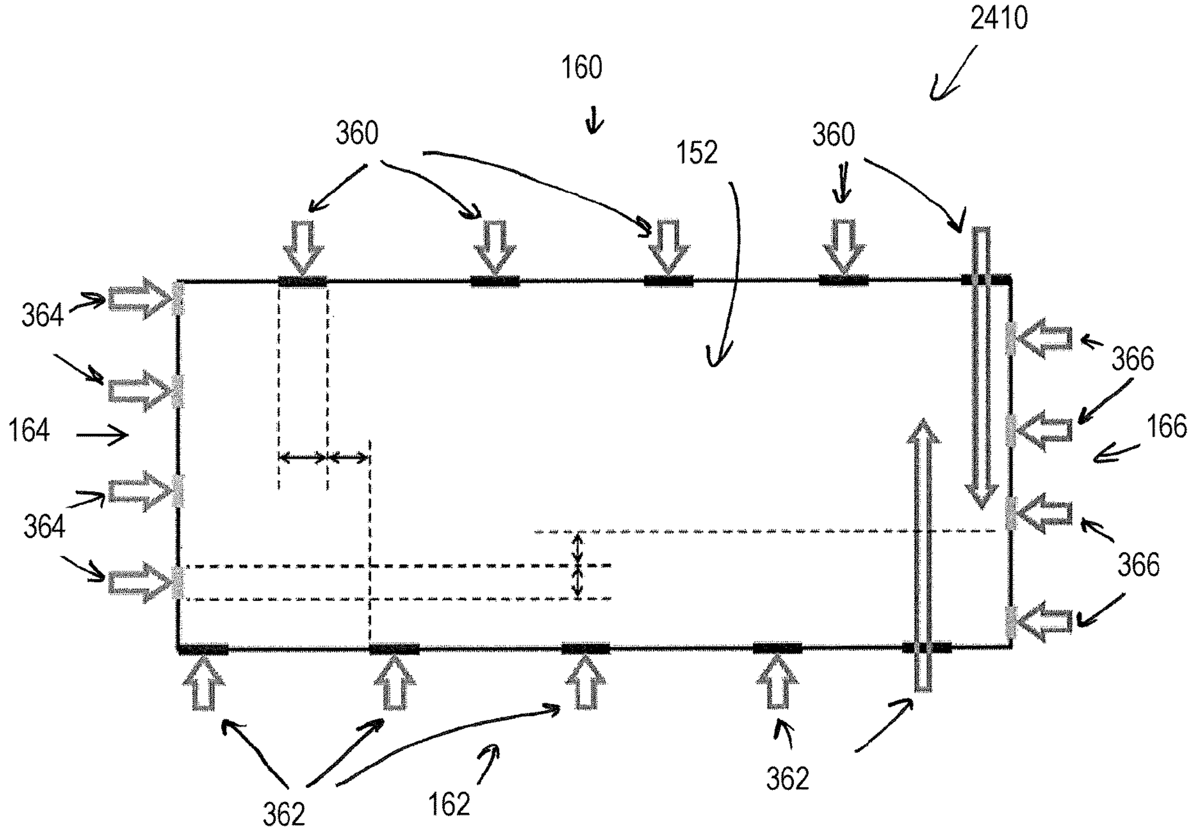
FIG. 25 is a schematic view of the positioning of the pluralities of control ports of the feedback-type fluidic oscillator of FIG. 24.

FIG. 25 shows a schematic view of the first, second, third, and fourth pluralities of control ports 360, 362, 364, 366 of the fluidic oscillator 2410 shown in FIG. 24. The first plurality of control ports 360 includes five control ports, and the second plurality of control ports 362 includes five control ports. The five control ports of the first plurality of control ports 360 alternate spatially with the five control ports of the second plurality of control ports 362 along the first portion 120 and second portion 130, respectively, such that gaps exist between the control fluid introduced by the first plurality of control ports 360 and the control fluid introduced by the second plurality of control ports 362. Although the first plurality of control ports 360 and second plurality of control ports 362 shown in FIG. 25 each include five control ports, in other implementations the first plurality of control ports and second plurality of control ports each include any number of control ports. Although a gap exists between the control fluid introduced by the first plurality of control ports 360 and the control fluid introduced by the second plurality of control ports 362 in FIG. 25, in other implementations, no gap exists between the control fluid introduced by the first plurality of control ports and the control fluid introduced by the second plurality of control ports.

Similarly, the third plurality of control ports 364 includes four control ports, and the fourth plurality of control ports 366 includes four control ports. The four control ports of the third plurality of control ports 364 alternate spatially with the four control ports of the fourth plurality of control ports 366 along the first outlet nozzle wall 153 and the second outlet nozzle wall 155, respectively, such that gaps exist between the control fluid introduced by the third plurality of control ports 364 and the control fluid introduced by the fourth plurality of control ports 366. Although the third plurality of control ports 364 and fourth plurality of control ports 366 shown in FIG. 25 each include four control ports, in other implementations the third plurality of control ports and fourth plurality of control ports each include any number of control ports. Although a gap exists between the control fluid introduced by the third plurality of control ports 364 and the control fluid introduced by the fourth plurality of control ports 366 in FIG. 25, in other implementations, no gap exists between the control fluid introduced by the third plurality of control ports and the control fluid introduced by the fourth plurality of control ports.

Figure 26:
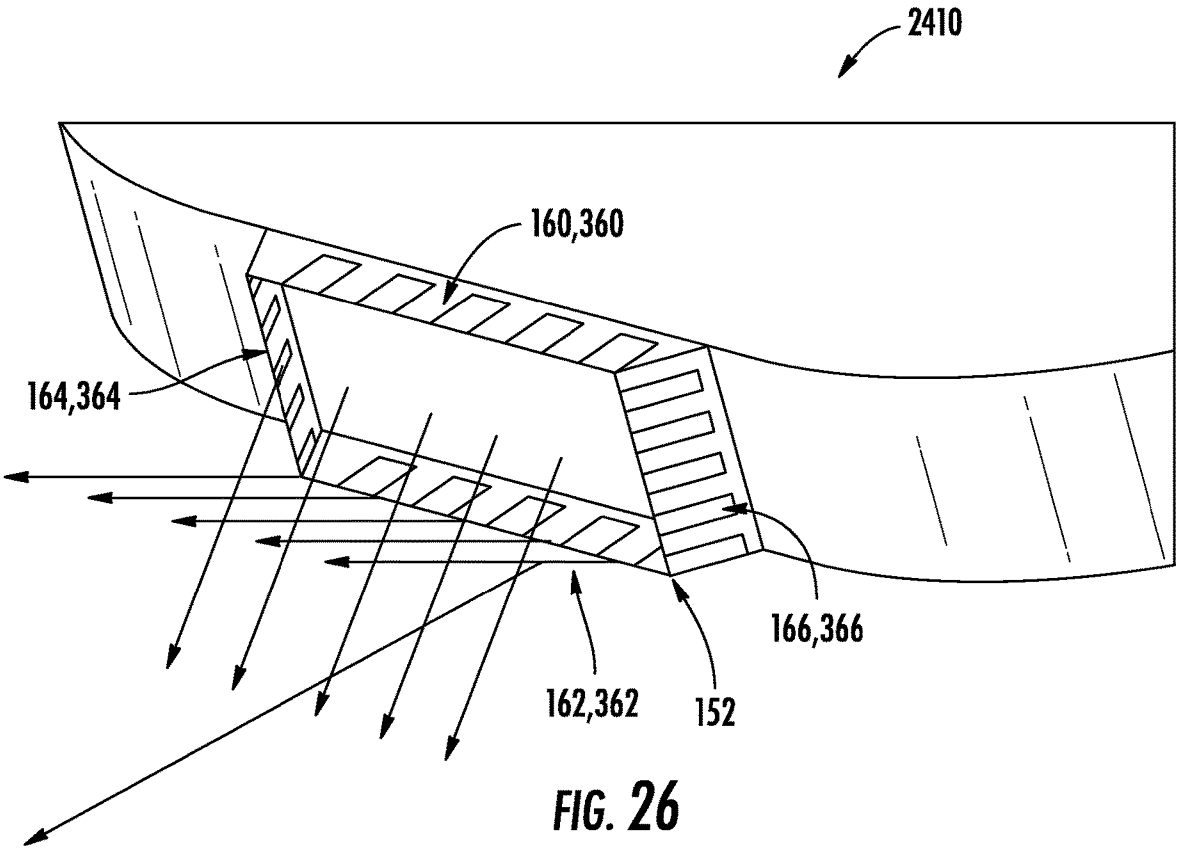
FIG. 26 is a perspective view of the feedback-type fluidic oscillator of FIG. 24, schematically showing the directions of portions of the fluid stream exiting the outlet nozzle.

The control fluid introduced (or the suction created) by the first, second, third, and fourth pluralities of control ports 360, 362, 364, 366 of the fluidic oscillator 2410 shown in FIGS. 24 and 25 is continuous. However, in all implementations discussed herein, the introduction of control fluid from (or the suction from) the first, second, third, and fourth pluralities of control ports 360, 362, 364, 366 can be continuous, time varied (e.g., periodic), or port varied (e.g., one control port can be continuous with the other control port being periodic, or one control port being introducing a control fluid with the other control port suctioning). FIG. 26 depicts the exit directions of the fluid stream 199 as it exits the outlet nozzle 152. As the oscillating fluid stream 199 exits the outlet nozzle 152 of the fluidic oscillator 2410, the first and second plurality of control ports 360, 362 deflect portions of the fluid stream 199 at an angle in the direction of the second portion 130 and portions of the fluid stream 199 at an angle in the direction of the first portion 120. Any portion of the fluid stream 199 that passes through the gaps between the control streams introduced by the first and second plurality of control ports 360, 362 continues to exit the outlet nozzle 152 in a plane parallel to the interaction chamber plane 176. Thus, a portion of the fluid stream 199 exits the outlet nozzle 152 in a direction angled toward the first portion 120, a portion of the fluid stream 199 exits the outlet nozzle 152 in a direction angled toward the second portion 130, and a portion of the fluid stream 199 exits the outlet nozzle 152 in a plane parallel to the interaction chamber plane 176. The exiting fluid stream 199 oscillates in a plane parallel to the interaction chamber plane 176 but is spread along a plane perpendicular to the interaction chamber plane 176, creating a 3D oscillation pattern.

The third and fourth plurality of control ports 364, 366 operate similarly to the third and fourth control ports 134, 136 of the implementation shown in FIG. 21 to alter the frequency and sweeping angle of the fluid stream 199 exiting the outlet nozzle 152 of the fluidic oscillator 2410.

Although the first, second, third, and fourth pluralities of control ports 360, 362, 364, 366 of the fluidic oscillator 2410 shown in FIGS. 24-25 are shown disposed between the first end 154 of the outlet nozzle 152 and the narrowest portion 158 of the outlet nozzle 152, the first, second, third, and fourth pluralities of control ports 360, 362, 364, 366 can also be disposed between the second end 156 of the outlet nozzle 152 and the narrowest portion 158 of the outlet nozzle 152 similar to the control ports 160, 162, 164, 166 of the implementation shown in FIG. 22.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. A fluidic oscillator comprising:

a first portion, a second portion, and a middle portion coupled between the first portion and the second portion, the middle portion have a first end and a second end opposite the first end, the middle portion comprising:

an interaction chamber, a fluid supply inlet for introducing a fluid stream into the interaction chamber, a single outlet nozzle disposed at the second end of the middle portion and downstream of the fluid supply inlet, wherein a fluid stream exits the interaction chamber through the single outlet nozzle such that the fluid stream oscillates to define a sweeping angle of the fluid stream exiting the single outlet nozzle, the single outlet nozzle having a first end, a second end, and a narrowest portion disposed between the first end of the single outlet nozzle and the second end of the single outlet nozzle, wherein the narrowest portion of the single outlet nozzle has a smallest inner area in a plane parallel to the second end of the middle portion, and the first end of the single outlet nozzle being closer than the second end of the single outlet nozzle to the fluid supply inlet, and a first control port and a second control port, the first control port for introducing a first control fluid into the fluidic oscillator in a first flow direction and the second control port for introducing a second control fluid into the fluidic oscillator in a second flow direction, the first control port being defined by the first portion and the second control port being defined by the second portion, the first and second control ports being defined by, and in fluid communication with, the single outlet nozzle, and wherein the first flow direction differs from the second flow direction, wherein the first control fluid and the second control fluid introduced into the fluidic oscillator are controllable to adjust the sweeping angle of the fluid stream exiting the single outlet nozzle for a given flow rate.

2. The fluidic oscillator of claim 1, wherein the first and second control ports are disposed between the first end of the outlet nozzle and the narrowest portion of the outlet nozzle.

3. The fluidic oscillator of claim 1, wherein the first and second control ports are disposed between the second end of the single outlet nozzle and the narrowest portion of the single outlet nozzle.

4. The fluidic oscillator of claim 1, wherein the middle portion further comprises a third control port and a fourth control port, wherein the third control port is defined by a first outlet nozzle side wall and the fourth control port is defined by a second outlet nozzle side wall opposite the first outlet nozzle side wall.

5. The fluidic oscillator of claim 1, wherein the first and second control ports continuously introduce the control fluid.

6. The fluidic oscillator of claim 1, wherein the first and second control ports are controlled by another fluidic oscillator.

7. The fluidic oscillator of claim 1, wherein the first control port comprises a first plurality of control ports and the second control port comprises a second plurality of control ports, wherein the first and second pluralities of control ports are disposed between the first end of the outlet nozzle and the narrowest portion of the outlet nozzle.

8. The fluidic oscillator of claim 1, wherein the first control port comprises a first plurality of control ports and the second control port comprises a second plurality of control ports, wherein the first and second pluralities of control ports are disposed between the second end of the outlet nozzle and the narrowest portion of the outlet nozzle.

9. The fluidic oscillator of claim 1, wherein the first control port comprises a first plurality of control ports and the second control port comprises a second plurality of control ports, wherein the fluidic oscillator further comprises a third plurality of control ports and a fourth plurality of control ports, wherein the third plurality of control ports is defined by a first outlet nozzle side wall and the fourth plurality of control ports is defined by a second outlet nozzle side wall opposite the first outlet nozzle side wall.

10. The fluidic oscillator of claim 1, wherein the first control port comprises a first plurality of control ports and the second control port comprises a second plurality of control ports, wherein the first and second pluralities of control ports continuously introduce the control fluid.

11. The fluidic oscillator of claim 4, wherein the third control port introduces a third control fluid, or the fourth control port introduces a fourth control fluid, into the fluidic oscillator to adjust the sweeping angle of the fluid stream exiting the single outlet nozzle.

* * * * *